United States Patent [19]

Ueno et al.

[11] Patent Number: 6,062,750

[45] Date of Patent: May 16, 2000

[54] PRINTER CAPABLE OF PRINTING A BACKGROUND IN ADDITION TO TEXT ON A TAPE ALONG WITH A DECORATING FEATURE TO EXTEND THE BORDER OF THE PRINTED TAPE

[75] Inventors: Hideo Ueno, Nagoya; Minako Ishida, Aichi; Sachiko Nakagawa, Kariya; Mizue Terai, Kasugai, all of Japan

[73] Assignee: Brother Kogyo Kabushiki Kaisha, Nagoya, Japan

[21] Appl. No.: 08/856,992

[22] Filed: May 15, 1997

[30] Foreign Application Priority Data

May 20, 1996 [JP] Japan ..................................... 8-124358

[51] Int. Cl.⁷ ...................................................... B41J 11/26
[52] U.S. Cl. ............................. 400/615.2; 400/76; 400/83
[58] Field of Search ................................... 400/83, 615.2, 400/76

[56] References Cited

U.S. PATENT DOCUMENTS

| | | | |
|---|---|---|---|
| 4,584,573 | 4/1986 | Ito | 340/734 |
| 5,393,147 | 2/1995 | Ueno et al. | 400/615.2 |
| 5,857,790 | 1/1999 | Gutsell et al. | 400/615.2 |

FOREIGN PATENT DOCUMENTS

| | | | |
|---|---|---|---|
| A 0249285 | 12/1987 | European Pat. Off. | 400/615.2 |
| A 0552562 | 7/1993 | European Pat. Off. | 400/615.2 |
| A 0575134 | 12/1993 | European Pat. Off. | 400/615.2 |
| A 58-16380 | 1/1983 | Japan | 400/83 |

OTHER PUBLICATIONS

Patent Abstract s of Japan, vol. 7, No. 90 (P–191), Apr. 14, 1983 (JP–A58–016380, Jan. 31, 1983).

Primary Examiner—Edgar Burr
Assistant Examiner—Charles H. Nolan, Jr.
Attorney, Agent, or Firm—Oliff & Berridge, PLC

[57] ABSTRACT

A printing apparatus comprises input means for inputting various characters, design setting means for selecting a design pattern including a frame to be added around the characters and a background pattern to be added on a background of the characters thereby to emphasize the characters, memory means for storing ornament frame data of an ornament frame to be arranged in both ends of the frame and mask data of the ornament frame, first data producing means for producing first frame data on the frame selected by the design setting means, the first frame data having a predetermined area, and first background pattern data on the background pattern selected by the design setting means, the first background pattern data having a predetermined area, second data producing means for producing design data by generating second background pattern data by a logical multiply of the first background pattern data and the mask data of the ornament frame and arranging the second background pattern data within second frame data specified by the ornament frame data and the first frame data, character data arrangement means for arranging character data input by means of the input means in the design data, and printing means for printing the design data and character data.

13 Claims, 25 Drawing Sheets

FIG. 4 (A)

| S 1 | INITIALIZATION |
|---|---|
| S 2 | PRINT IMAGE DISPLAYING PROCESS |
| S 3 | KEY INPUT ? |
| S 4 | AREA DESIGNATING KEY ? |
| S 5 | AREA DESIGNATING PROCESS |
| S 6 | FORMAT WITHIN AREA CHANGING PROCESS |
| S 7 | FORMAT SETTING KEY ? |
| S 8 | FORMAT SETTING PROCESS |
| S 9 | PRINT KEY ? |
| S 10 | PRINTING PROCESS |
| S 11 | PROCESS IN RESPONSE TO INPUT KEY |

FIG. 5 (A)

| S 5 | AREA DESIGNATION PROCESS |
|---|---|
| S 2 0 | SETTING AREA START POSITION AND END POSITION AT CURRENT CURSOR POSITION |
| S 2 1 | PRINT IMAGE DISPLAYING PROCESS |
| S 2 2 | REVERSAL DISPLAY OF AREA FROM START TO END POSITIONS |
| S 2 3 | KEY INPUT ? |
| S 2 4 | RIGHT AND LEFT KEYS ? |
| S 2 5 | CHANGE AND SAVE THE POSITION OF AREA START AND END POSITIONS |
| S 2 6 | RETURN KEY ? |

FIG. 6 (A)

| S 6  | FORMAT WITHIN AREA CHANGING PROCESS |
|------|--------------------------------------|
| S 30 | COPY TEXT MEMORY |
| S 31 | PRINT IMAGE DISPLAYING PROCESS |
| S 32 | REVERSAL DISPLAY OF AREA FROM START TO END POSITIONS |
| S 33 | KEY INPUT ? |
| S 34 | RULED LINE KEY ? |
| S 35 | CHANGE BACKGROUND PATTERN, FRAME, ETC. WITHIN THE AREA (SET PARTIAL FORMAT INFORMATION) |
| S 36 | SIZE KEY ? |
| S 37 | CHANGE SIZE WITHIN THE AREA (SET PARTIAL FORMAT INFORMATION) |
| S 38 | FONT KEY ? |
| S 39 | CHANGE FONT WITHIN THE AREA (SET PARTIAL FORMAT INFORMATION) |
| S 40 | DESIGN KEY ? |
| S 41 | SET DESIGN WITHIN THE AREA (SET PARTIAL FORMAT INFORMATION) |
| S 42 | CANCEL KEY ? |
| S 43 | REGENERATE TEXT MEMORY COPIED |
| S 44 | RETURN KEY ? |

FIG. 7 (A)

| S 8  | FORMAT SETTING PROCESS |
|------|---------------------------------------|
| S 50 | PRODUCE FORMAT SETTING IMAGE |
| S 51 | KEY INPUT ? |
| S 52 | RIGHT AND LEFT KEYS ? |
| S 53 | SHIFT CURSOR IN RIGHT AND LEFT DIRECTIONS |
| S 54 | UP AND DOWN KEYS ? |
| S 55 | CHANGE FORMAT IN RESPONSE TO CURSOR |
| S 56 | RETURN KEY ? |

FIG. 8 (A)

| S10 | PRINTING PROCESS |
|---|---|
| S60 | ARRANGEMENT INFORMATION PRODUCING PROCESS |
| S61 | INITIALIZATION OF DESIGN PATTERN PARAMETER<br>   FSP ← START ADDRESS<br>   FEP ← END ADDRESS<br>   FC ← 0 |
| S62 | READ A GROUP OF DATA OF ADDRESS INDICATED BY FSP + (FC × 10) |
| S63 | BACKGROUND PATTERN ? |
| S64 | PUT BACKGROUND PATTERN DOT DATA ON BACKGROUND PATTERN FORMING AREA IN PRINTING BUFFER |
| S65 | FC ← (FC + 1) |
| S66 | FSP + (FC × 10) = FEP ? |
| S68 | "AND" OF ORNAMENT FRAME AND ORNAMENT MASK DATA IN PRINTING BUFFER TO DELETE BACKGROUND PATTER |
| S69 | STORE ORNAMENT FRAME DATA IN PRINTING BUFFER AND CONNECT IT WITH PARALLEL LINES |
| S70 | DRAW IMAGE DATA OF UNDERLINE DESIGNATED IN PRINTING BUFFER |
| S71 | INITIALIZATION OF CHARACTER PARAMETER<br>   CSP ← START ADDRESS<br>   CEP ← END ADDRESS<br>   CC ← 0 |
| S72 | READ A GROUP OF DATA OF ADDRESS INDICATED BY CSP + (CC × 10) |
| S73 | STORE DOT PATTERN FOR PRINTING IN PRINTING BUFFER |
| S74 | CC ← (CC + 1) |
| S75 | CSP + (CC × 10) = CEP ? |
| S76 | OUTPUT DOT IMAGE DATA FOR PRINTING |

FIG. 9 (A)

| | |
|---|---|
| S60 | ARRANGEMENT INFORMATION PRODUCING PROCESS |
| S80 | RETRIEVE TEXT MEMORY TO PRODUCE CHARACTER ARRANGEMENT INFORMATION BASED ON CHARACTER CODE AND FORMAT INFORMATION |
| S81 | RETRIEVE CHARACTER ARRANGEMENT INFORMATION TO PRODUCE DESIGN PATTERN ARRANGEMENT INFORMATION |
| S82 | SET POINTER AT A START OF TEXT MEMORY |
| S83 | POINTER ≠ EOT ? |
| S84 | PARTIAL FORMAT ? |
| S85 | BACKGROUND PATTERN AND FRAME ARE SET ? |
| S86 | PROCEED POINTER BY ONE CHARACTER |
| S87 | COPY FORMAT INFORMATION |
| S88 | RETRIEVE CHARACTER ARRANGEMENT INFORMATION BY ALLOWING POINTER TO SCAN FROM PARTIAL FORMAT TO EOP TO CALCULATE COORDINATE OF FX1, FX2, FY1, AND FY2 OF DESIGN PATTERN |
| S89 | READ FORMAT INFORMATION COPIED |
| S90 | BACKGROUND PATTERN ? |
| S91 | FX1 ← FX1 - WIDTH OF ORNAMENT FRAME<br>FX2 ← FX2 + WIDTH OF ORNAMENT FRAME |
| S92 | CHANGE DESIGN PATTERN ARRANGEMENT INFORMATION |
| S93 | SORT DESIGN PATTERN ARRANGEMENT INFORMATION TO ARRANGE BACKGROUND PATTERN DATA BEFORE CHARACTER ARRANGEMENT INFORMATION |

FIG. 10 (A)

| S 2 | START PRINT IMAGE DISPLAYING PROCESS |
|---|---|
| S 9 9 | ARRANGEMENT INFORMATION PRODUCING PROCESS |
| S 1 0 0 | CONVERT ALL OF X-, Y-POSITION AND WIDTH OF CHARACTER IN ARRANGEMENT INFORMATION INTO THOSE FOR DISPLAY |
| S 1 0 1 | INITIALIZATION OF DESIGN PATTEN PARAMETER<br>FSP ← START ADDRESS<br>FEP ← END ADDRESS<br>FC ← 0 |
| S 1 0 2 | READ A GROUP OF DATA OF ADDRESS INDICATED BY<br>FSP + (FC×10) |
| S 1 0 3 | BACKGROUND PATTERN ? |
| S 1 0 4 | PASTE BACKGROUND PATTERN DOT DATA IN BACKGROUND PATTERN FORMING AREA IN DISPLAYING BUFFER |
| S 1 0 5 | FC ← (FC+1) |
| S 1 0 6 | FSP + (FC×10) = FEP ? |
| S 1 0 7 | ORNAMENT FRAME ? |
| S 1 0 8 | AND OF ORNAMENT FRAME AND ORNAMENT FRAME MASK DATA IN DISPLAYING BUFFER TO DELETE BACKGROUND PATTERN |
| S 1 0 9 | STORE ORNAMENT FRAME DATA AND CONNECT IT WITH PARALLEL LINES |
| S 1 1 0 | DRAW IMAGE OF UNDERLINE INDICATED IN DISPLAYING BUFFER |
| S 1 1 1 | INITIALIZATION OF CHARACTER PARAMETER<br>CSP ← START ADDRESS<br>CEP ← END ADDRESS<br>CC ← 0 |
| S 1 1 2 | READ A GROUP OF DATA OF ADDRESS INDICATED BY<br>CSP + (CC×10) |
| S 1 1 3 | STORE DOT PATTERN IN DISPLAYING BUFFER |
| S 1 1 4 | CC ← (CC + 1) |
| S 1 1 5 | CSP + (CC× 10)=CEP ? |
| S 1 1 6 | OUTPUT DISPLAYING BUFFER ON LIQUID CRYSTAL DISPLAY |

FIG. 14

| CODE | X-POSITION | Y-POSITION | CHARACTER WIDTH | FORMAT INFORMATION |
|---|---|---|---|---|
| C | C X 1 | C Y 1 | C W 1 | FORMAT INFORMATION |
| A | C X 2 | C Y 2 | C W 2 | FORMAT INFORMATION |
| N | C X 3 | C Y 3 | C W 3 | FORMAT INFORMATION |
| D | C X 4 | C Y 4 | C W 4 | FORMAT INFORMATION |
| Y | C X 5 | C Y 5 | C W 5 | FORMAT INFORMATION |

FIG. 15

| X1-POSITION1 | X2-POSITION | Y1-POSITION | Y2-POSITION | FORMAT INFORMATION |
|---|---|---|---|---|
| F X 1 | F X 1 | F Y 1 | F Y 1 | FORMAT INFORMATION |
| F X 1 | F X 2 | F Y 2 | F Y 2 | FORMAT INFORMATION |

51 52 53 54 55

50

56: 0, 10, 20

PRINTER CAPABLE OF PRINTING A BACKGROUND IN ADDITION TO TEXT ON A TAPE ALONG WITH A DECORATING FEATURE TO EXTEND THE BORDER OF THE PRINTED TAPE

BACKGROUND OF THE INVENTION

1. Field of the Invention

The present invention relates to a printing apparatus such as a word processing apparatus, a tape printer, etc., and more particularly to a printing apparatus which can form a background pattern in only the entire area within a frame.

2. Description of Related Art

Conventional printing apparatus such as a word processing apparatus is provided with a design function for printing a frame 100 around the characters "ABC" as shown in FIG. 23 to allow the characters to be looked impressive and with another design function for adding a background pattern to the characters "ABC" and the frame 100, similarly, to allow the characters to attractively appear.

For example, as disclosed in Japanese Patent Application laid-open No. SHO 58-16380, the production of a background pattern in addition to both the characters "ABC" and the frame 100 in FIG. 23 in the conventional printing apparatus has been conducted by the logical sum (an OR process) of a background pattern data and a character data (and a frame data) in each data area 101 in an input character size shown in FIG. 24, to generate a character data (and a frame data) synchronized with the background pattern data.

Therefore, when a background pattern is added to both the characters "ABC" and the frame 100, the background pattern may be printed beyond both lateral sides of the frame 100 excepting upper and lower edges of the frame where the border of the data area 101 and the frame 100 coincide, as shown in FIG. 25. The thus printed characters and frame deteriorate in appearance. On the other hand, when a background pattern is added to only the characters "ABC", a blank may be generated inside of both lateral sides of the frame 100 as shown in FIG. 26, providing a worse appearance to the printed characters similarly to the above case.

In addition to a frame surrounding characters "abc" which are smaller in size than the above characters "ABC", when a background pattern is added to only the characters "abc", a blank may be produced in the periphery of the characters "abc" within the frame 100 as shown in FIG. 27, causing a deterioration in appearance of the printed characters and frame.

SUMMARY OF THE INVENTION

The present invention has been made in view of the above circumstances and has an object to overcome the above problems and to provide a printing apparatus capable of producing a background pattern in only the entire area within a frame when a setting of a background pattern is made on a frame or inside the frame, thereby improving the appearance of a printed text.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a printing apparatus of this invention comprises input means for inputting various characters, design setting means for selecting a design pattern including a frame to be added around said characters and a background pattern to be added on a background of said characters thereby to emphasize the characters, memory means for storing ornament frame data of an ornament frame to be arranged in both ends of said frame and mask data of the ornament frame, first data producing means for producing first frame data on the frame selected by said design setting means, the first frame data having a predetermined area, and first background pattern data on the background pattern selected by said design setting means, the first background pattern data having a predetermined area, second data producing means for producing design data by generating second background pattern data by a logical multiply of said first background pattern data and said mask data of the ornament frame and arranging the second background pattern data within second frame data specified by said ornament frame data and the first frame data, character data arrangement means for arranging character data input by means of said input means in the design data, and printing means for printing said design data and character data.

In the printing apparatus constructed as above, when a setting is made by the design setting means to add a frame around the characters input by the input means and also a background pattern on the back of the characters within the frame, the printing means can print a text of the characters surrounded by the frame and the background pattern in only the entire area of the inside of the frame. To produce such a printout text, first, the second data producing means produces design data that a background pattern is added to only the frame and the entire area within the frame. Specifically, when the formation of the frame surrounding the characters and the background pattern on the back of the characters is set by means of the design means, the first data producing means produces the first background pattern data having a predetermined area and the first frame data based on the characters and frames set by the design means. Mask data of the ornament frame corresponding to both side portions of the frame, read from the memory means, is logically multiplied with the first background pattern data based on the characters set by the design means to delete the part of the first background pattern data positioned outside the ornament frame. By arranging the second background pattern data with respect to the second frame data to form the design data. To the contrary, the second frame data may be arranged with respect to the second background pattern data. Next, the character data are arranged within in the second frame data in the design data by means of the character arrangement means, after that the design data are printed by the printing means. In this way, when a background pattern is selected to be added inside the frame, the background pattern can be generated in the entire area of the frame, so that the appearance of the printed text can be improved.

In another aspect of the present invention, there is provided a printing apparatus comprising input means for inputting various characters, design setting means for selecting a design pattern including a frame to be added around said characters and a background pattern to be added on a background of said characters thereby to emphasize the characters, first memory means for storing ornament frame data of ornament frames to be arranged in both sides of said frame, and mask data of the ornament frame, second memory means for storing position data which specifies an area in which said frame and background pattern are to be formed, data changing means for changing the position data of the background pattern stored in the second memory means so that a background pattern is extended by a length of the ornament frame in both sides of the background pattern when said design pattern is a background pattern, first data producing means for producing first frame data of the frame selected by said design setting means, and first background pattern data of the background pattern selected by said design setting means, based on the forming area specified by the position data stored in the second memory means, second data producing means for producing design data by generating second background pattern data by a logical multiply of said first background pattern data and said mask data of the ornament frame and arranging the second background pattern data within the second frame data specified by said ornament frame data and the first frame data, character data arrangement means for arranging character data input by means of said input means into the design data, and printing means for printing said design data and character data.

In the printing apparatus constructed above, when a selection is made to add a design pattern including a frame and a background pattern to the characters input by means of the input means, where the design pattern is a background pattern, the position data of the background pattern stored in the second memory means in response to a length of the ornament frame in both sides of the background pattern. After that, the first frame data is produced by the first data producing means based on the forming area specified by the position data stored in the second memory means, and also the first background pattern data is produced by the first data producing means based on the position data changed by the data changing means. By the second data producing means, a logical multiply (AND) of the first background pattern data and the mask data of the ornament frame stored in the first memory means is calculated to generate the second background pattern data, and the second background pattern data is arranged in the second frame data specified by the ornament frame data store in the first memory means and the first frame data, thus generating the design data. After the design data is generated in the above way, the character data input by the input means is arranged in the design data by means of the character data arrangement mends. Then, the design data and the character data are printed by means of the printing means.

According to the above printing apparatus, when a selection is made to add a background pattern inside a frame, the background pattern can be put on only the entire area within the frame. This makes it possible to obtain a printout text excellent in appearance.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIGS. 4 and 4(A) are a flow chart and a table for explaining a main process of the tape printing apparatus;

FIGS. 5 and 5(A) are a flow chart and a table for explaining a process for setting an area in the tape printing apparatus;

FIGS. 6 and 6(A) are a flow chart and a table for explaining a process for changing a format within the area in the tape printing apparatus;

FIGS. 7 and 7(A) are a flow chart and a table for explaining a process for setting a format in the tape printing apparatus;

FIGS. 8 and 8(A) are a flow chart and a table for explaining a printing process in the tape printing apparatus;

FIGS. 9 and 9(A) are a flow chart and a table for explaining a process for generating arrangement information in the tape printing apparatus;

FIGS. 10 and 10(A) are a flow chart and a table for explaining a process for displaying a printout image in the tape printing apparatus;

FIG. 14 is a view for explaining a data structure of character arrangement information in a character arrangement information memory area;

FIG. 15 is a view for explaining a data structure of design pattern arrangement information in a design pattern arrangement information memory area;

DETAILED DESCRIPTION OF THE PREFERRED EMBODIMENTS

A detailed description of one preferred embodiment of a printing apparatus embodying the present invention will now be given referring to the accompanying drawings.

Figure 1:
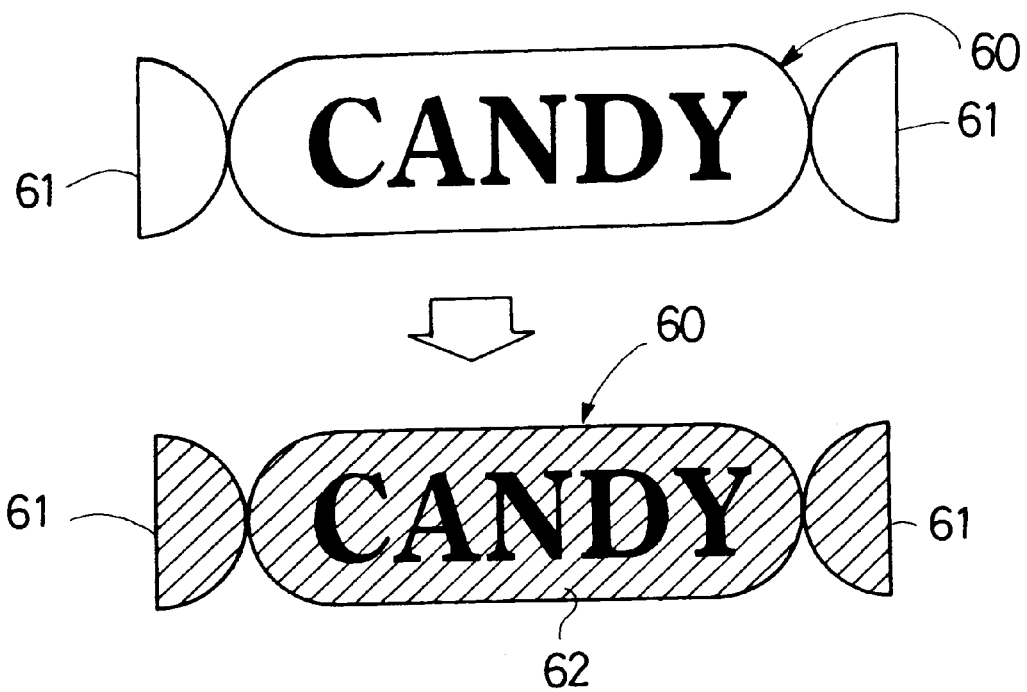
FIG. 1 is a view showing a text printed when a setting is made to add a background pattern to characters with a frame surrounding it in an embodiment of a tape printing apparatus according to the present invention.
Figure 21:
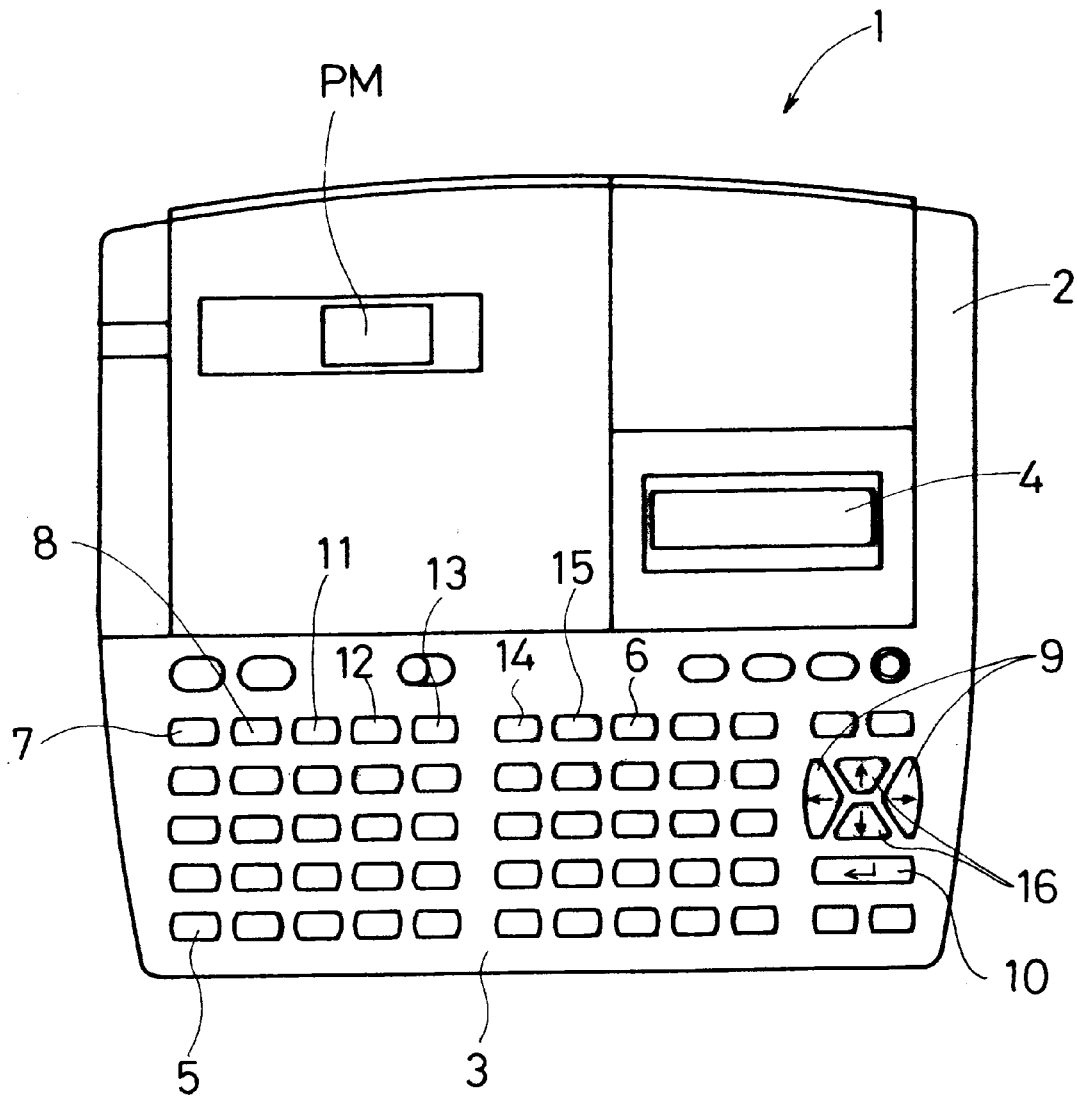
FIG. 21 is a schematic plane view of the tape printing apparatus.

A tape printing apparatus 1 shown in FIG. 21 in the embodiment according to present invention can print on a printing tape characters, for example, "CANDY" with a frame 60 as shown in FIG. 1 and a background pattern 62 in the entire area within the frame 60 when selected is the formation of a background pattern on the back of the characters. In particular, it can form the background pattern 62 in the entire area within the frame 60 even if the shape of the frame 60 is not only a simple shape such as a quadrilateral frame 100 shown in FIG. 23 but also a complex shape by adding ornament frames 61 at both ends of an ellipse frame as shown in FIG. 1.

The structure of the tape printing apparatus 1 will schematically be described with reference to FIG. 21. The tape printing apparatus 1 comprises a body frame 2, a keyboard 3 which is an input means and is arranged at a front portion (a lower portion in the drawing) of the body frame 2, and a liquid crystal display 4 for displaying character images such as letters, numerals, etc. input with the keyboard 3, disposed at an upper right side of the keyboard 3 in the drawing.

The keyboard 3 is provided with various keys needed for operating the tape printing apparatus 1, which will be mentioned later. For example, the keys include a character key 5 for inputting desired characters such as letters, numerals, etc., an area designating key 6 for designating the area where a background pattern is to be formed (called a background pattern forming area hereinafter), a format setting key 7 for selecting the type of frames and other formats, a print key 8 for conducting a printing operation, right and left keys 9 for shifting a cursor displayed on the liquid crystal display 4 in a right and left directions thereon, a return key 10 for instructing various processing operations, a ruled line key 11 for selecting the type of background pattern and the like, a size key 12 for selecting the size of characters, a font key 13 for selecting the font of characters, for example, a Ming-cho type and a bold-faced type or the like, a style key 14 for selecting a printing style of the characters, for example, an outline style, a stereo style, etc., a cancel key 15 for cancelling the practice of various processing operations, and an up and down keys 16 for shifting the cursor displayed on the liquid crystal display 4. Other keys needed in the tape printing apparatus 1 are also provided.

Figure 22:
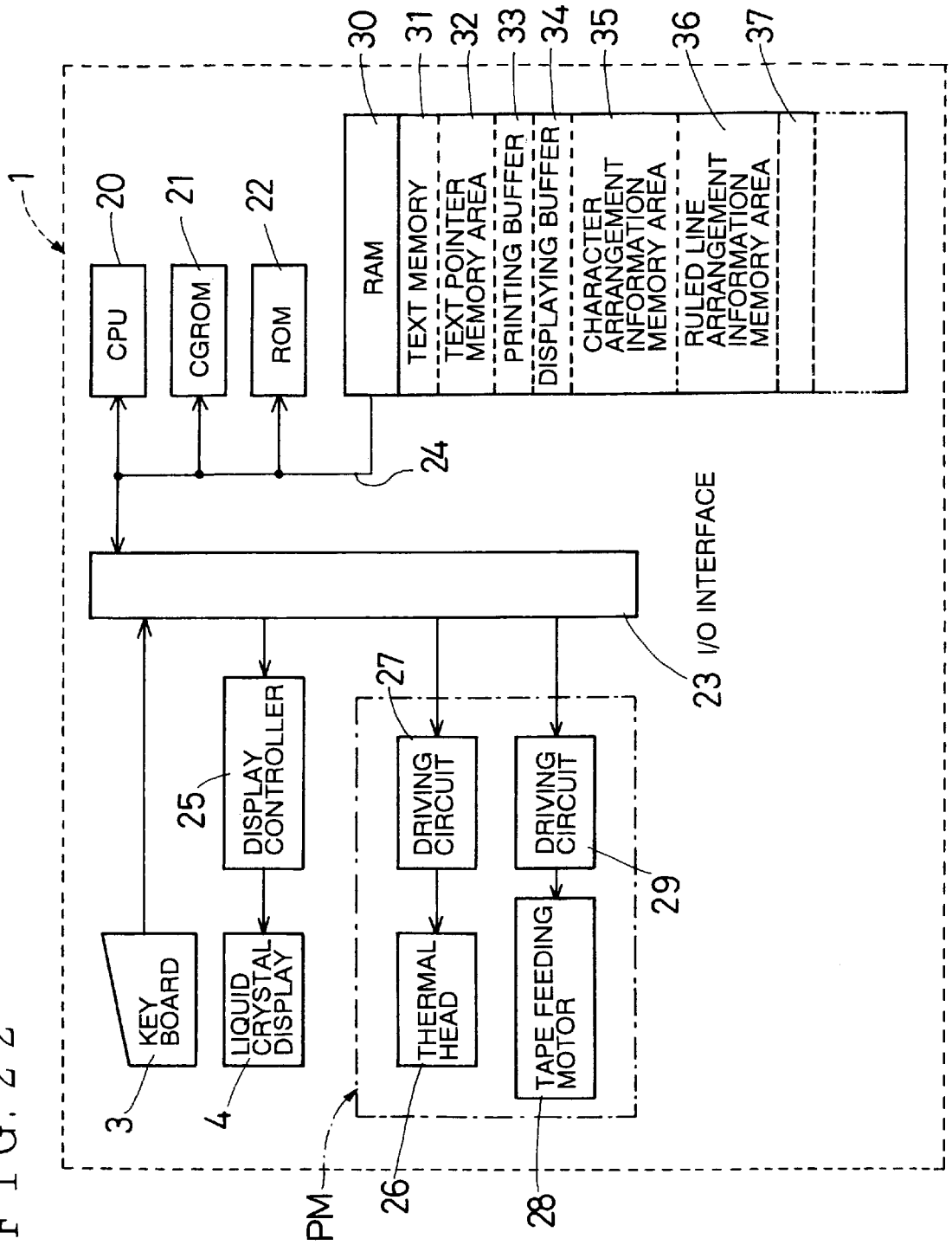
FIG. 22 is a block diagram for explaining a system of the tape printing apparatus.

Control system of the tape printing apparatus 1 will be described referring to a block diagram of FIG. 22. As shown in FIG. 22, this control system comprises a CPU 20 for controlling the operation of the tape printing apparatus 1, a CGROM 21, a ROM 22, a RAM 30, and an input and output (I/O) interface 23 and so on, which are connected to the CPU 20 via a bus 24. The CGROM 21 functioning as a memory means stores dot pattern for characters such as letters, numerals, etc., dot pattern data for printing, background pattern data for various background patterns, ornament frame data for various ornament frames, mask data for such the ornament frames, and the like. Regarding the ornament frames 61 shown in FIG. 1, for example, the CGROM 21 stores a couple of ornament frame data 61D shown in FIG. 2 and mask data 61M shown in FIG. 3.

The ROM 22 contains various programs for a main process mentioned later in FIG. 4, an area setting process in FIG. 5, a format within the area changing process in FIG. 6, a format setting process in FIG. 7, a printing process in FIG. 8, an arrangement information generating process in FIG. 9, an image display process in FIG. 10, and other programs needed for controlling the tape printing apparatus 1. The RAM 30 is a memory area used for the CPU 20 in carrying out the various programs, which contains various memories such as a text memory 31, a text pointer memory area 32, a printing buffer 33, a displaying buffer 34, a character arrangement information memory area 35, a design pattern arrangement information memory area 36, and a memory area 37 for other information.

Figure 13:
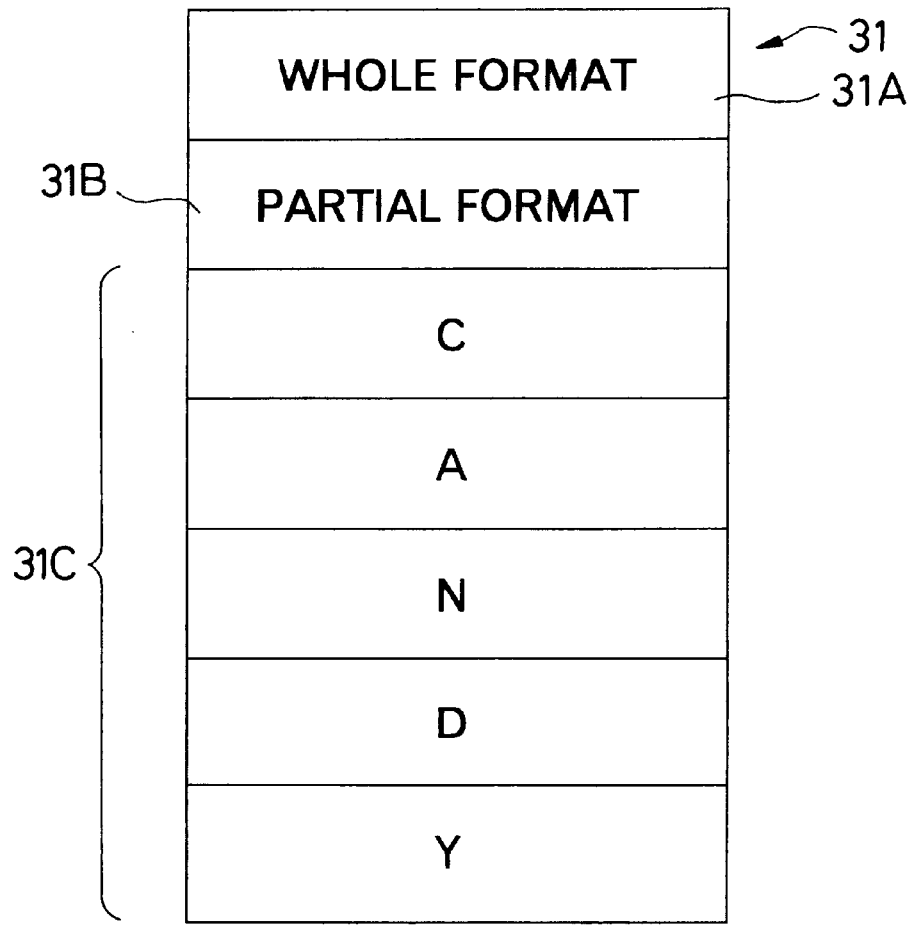
FIG. 13 is a view for explaining a data structure in a text memory.

The text memory 31 stores code data for format information of a text and for characters input from the keyboard 3. If the characters "CANDY" are input with the character keys 5 on the keyboard 3, for example, the text memory 31 stores the whole format 31A which is format information on the whole text, a partial format which is format information on a part of the text, which corresponds to "CANDY" in this embodiment, and each code data 31C for the characters "CANDY" as shown in FIG. 13. In particular, the whole format 31A includes the information on the frame to be added to the entire text (called a whole frame hereinafter). The partial format 31B includes the information on a background pattern and an underline and the like which are to be put on a part of the text. The text pointer memory area 32 stores a pointer to indicate the whole format 31A, the partial format 31B, and each code data 31C in order. This pointer will hereinafter be called a text pointer TP.

The printing buffer 33 stores data which are read out from the CGROM 21 based on the code data stored in the text memory 31 and transferred to the printing buffer 33. A thermal head 26 performs dot printing in accordance with the data stored in the printing buffer 33. The displaying buffer 34 stores the data that are read out from the CGROM 21 based on the code data stored in the text memory 31 and transferred to the displaying buffer 34. The liquid crystal display 4 displays in accordance with the data stored in the displaying buffer 34.

Figure 24:
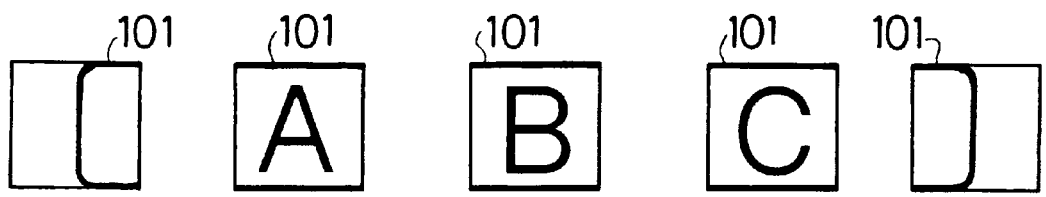
FIG. 24 is a view showing data area of character data and frame data which are logically summed with a background pattern data in forming a background pattern with the characters surrounded by the frame in the printing apparatus in the prior art.
Figure 25:
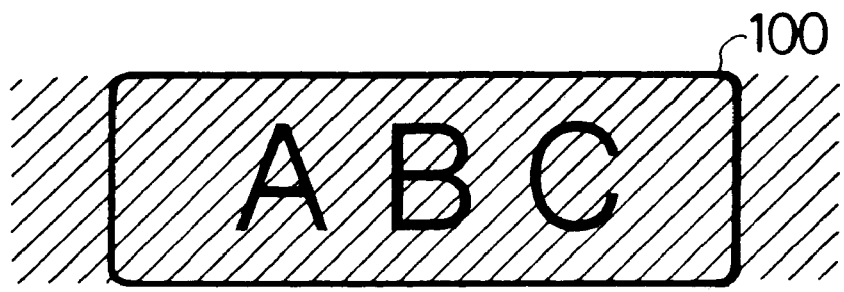
FIG. 25 is a view of an example of a printed text when the formation of the background pattern with the characters surrounded by the frame is set in the printing apparatus in the prior art.
Figure 26:
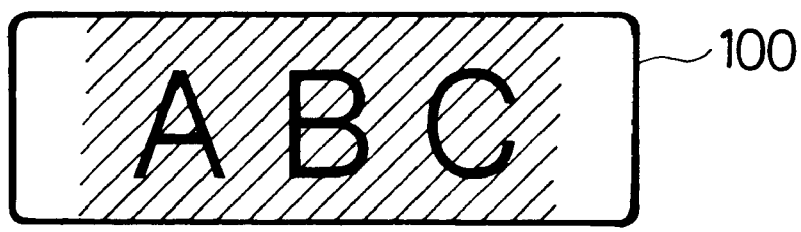
Figure 27:
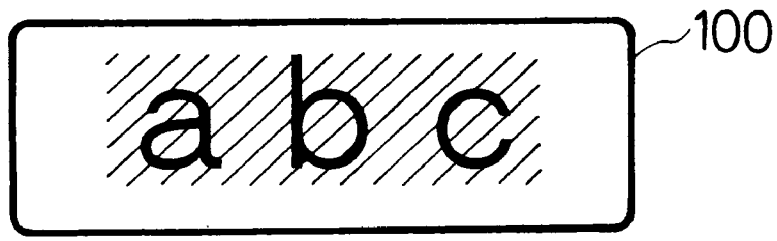
FIG. 27 is a view of another example of a printed text when the formation of the background pattern with the characters surrounded by the frame is set in the printing apparatus in the prior art.

The character arrangement information memory area 35 is a memory for storing the information on the character arrangement produced in an arrangement information producing process which will be described referring to FIG. 9. Here, the character arrangement information is explained with reference to FIG. 14. The character arrangement information 40 is constructed of code data 41 for each character, X-position data 42 and Y-position data 43 which specify the position of each character, character width data 44 for the width of each character, and format information 45 which is the information on each character, and the like. Using FIG. 24 mentioned above in the prior art, for example, the position indicated by the X- and Y-position data 42 and 43 represents a left lower end point of the data area 101 in FIG. 24. Similarly, the character width data 44 represents the lateral width of the data area 101. Here, FIG. 14 shows the construction of the character arrangement information 40 in the case that the characters "CANDY" are input with the character keys 5 of the keyboard 3. The numerals applied in a line in a left side of the character arrangement information 40 are address numbers 46.

Figure 9:
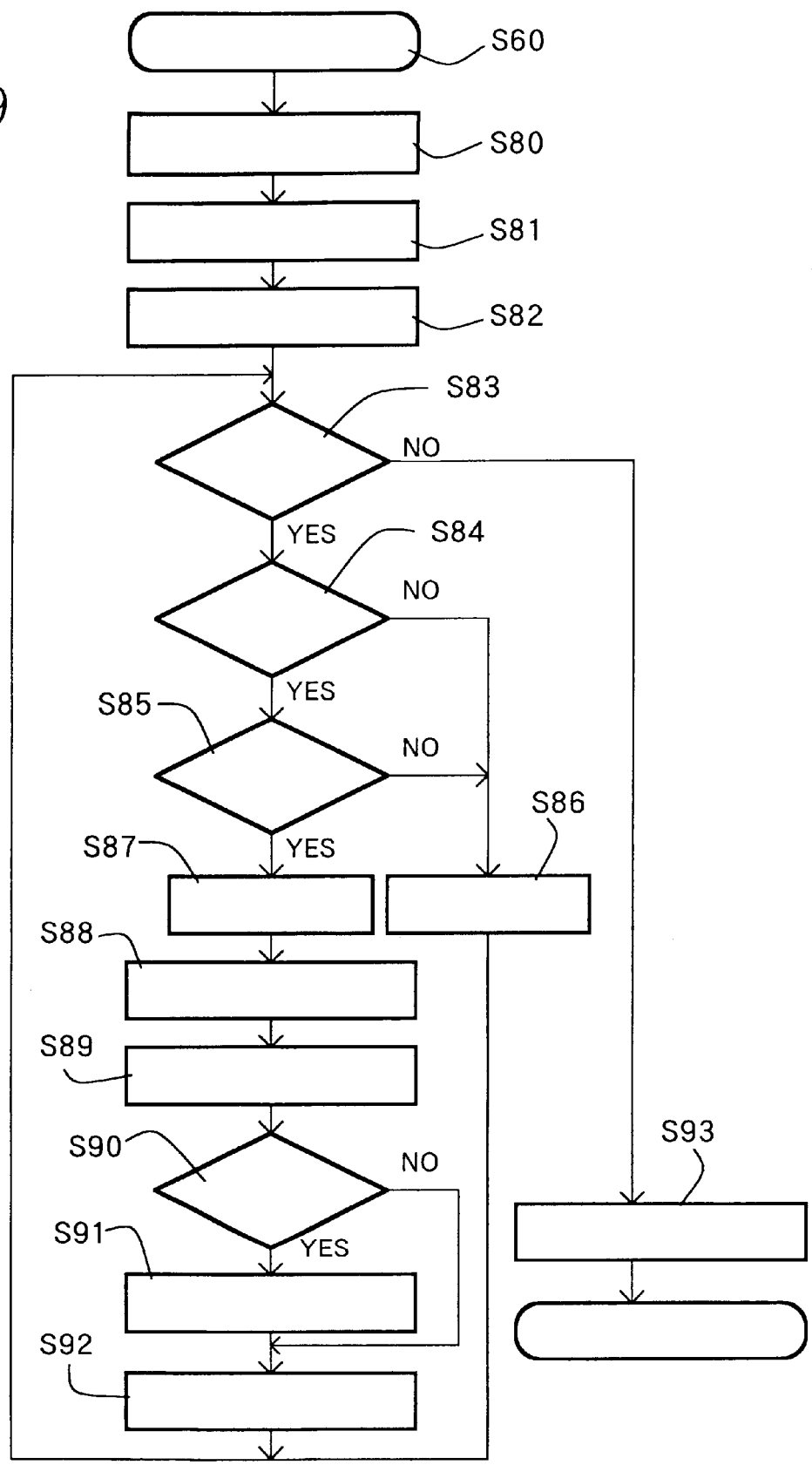
Figure 10:
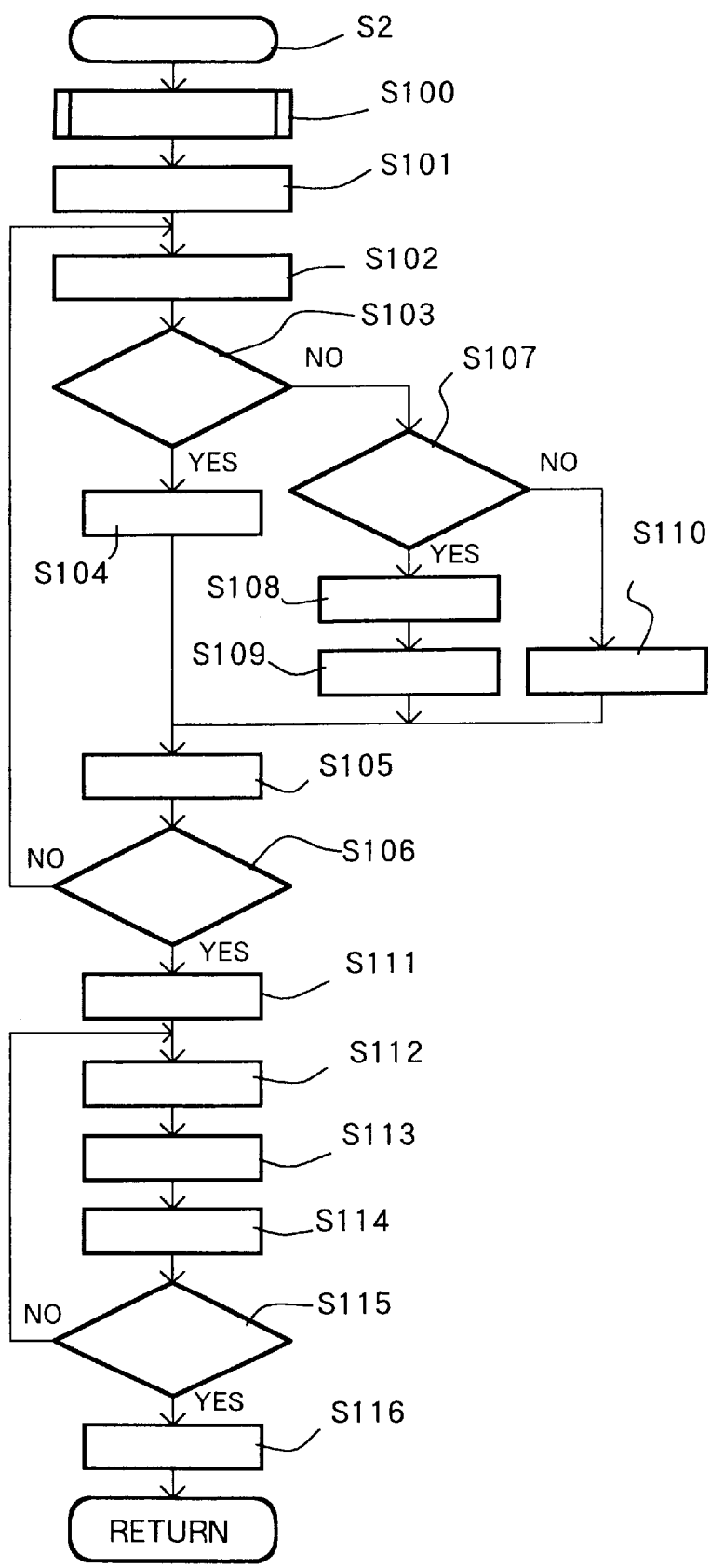

The design pattern arrangement information memory area 36 is a memory for storing the arrangement information concerning a design pattern including frame and background pattern and the like, generated at the arrangement information generating process which will be described later and is shown in FIG. 9. Here, the design pattern arrangement information is explained with reference to FIG. 15. The design pattern arrangement information 50 is constructed of an X1 position data 51, an X2 position data 52, a Y1 position data 53, a Y2 position data 54 each for specifying the position of a frame, a background pattern, and an underline and the like, and format information 55 which is the information data concerning the frame, the background pattern, the underline and others. The design pattern arrangement information 50 in FIG. 15 shows a case where the formation of the frame 60 with the ornament frames 61 and the background pattern 62 is set using various keys of the keyboard 3, two diagonal points in the background pattern forming area of the background pattern 62, determined by the X1, X2, Y1, and Y2 position (coordinate) data 51, 52, 53, and 54 specify the position of the background pattern forming area of the background pattern 62. At this time, the left lower end point of the data area 101 (see FIG. 24) for the left ornament frame 61 is specified by the X1 and Y1 position data 51 and 53, and the right upper end point of the data area 101 for the right ornament frame 61 is specified by the X2 and Y2 position data 52 and 54, thereby to specify the position of the frame 60 provided with the ornament frames 61.

In the present embodiment, in the arrangement information generating process mentioned later in FIG. 9, the information on a background pattern is arranged at an upper (earlier) step than the information on a frame and an underline. A group of data at the upper step of the design pattern arrangement information 50 in FIG. 15 is the information on the background pattern 62 and another group of data at the lower step is the information on the frame 60 with the ornament frames 61. As no underline and the like is set in FIG. 1, there is no information on an underline and the like in the design pattern arrangement information 50 in FIG. 15. The numerals applied in a line in a left side of the design pattern arrangement information 50 are address numbers 56.

At this time, returning to FIG. 22 to continue the explanation of the construction of the tape printing apparatus 1, to the I/O interface 23 are connected the keyboard 3, a display controller 25, and a thermal printing mechanism PM and the like. When characters and others are input with the character keys 5 on the keyboard 3, with the display controller 25, the dot pattern corresponding to the input characters is displayed on the liquid crystal display 4 after the print image displaying process shown in FIG. 10 mentioned later. The thermal printing mechanism PM drives the thermal head 26 via a driving circuit 27 based on the printing process and the like in FIG. 8, mentioned later, to print the data stored in the printing buffer 33 and, synchronously, drives a tape feeding motor 28 via a driving circuit 29 to control the feeding of the printing tape.

Next, the operation of the tape printing apparatus 1 constructed as above will be explained with reference to FIG. 4 through FIG. 20. FIG. 4 is a flow chart of a main process in the tape printing apparatus 1, wherein comprised are an area setting process functioning as design means and a format setting process, and other processes. At first, an initialization process is conducted on the whole data of the tape printing apparatus 1 in a step S1. In a step S2, next, conducted is a printout image displaying process shown in FIG. 10, for displaying the image to be printed on the printing tape on the liquid crystal display 4, the detail of which will be mentioned later referring to FIG. 10.

It is determined in a step S3 whether any key on the keyboard 3 has been input. When it is determined that any key has been input (S3: Yes), the program is advanced to a step S4. On the other hand, when no key input is detected (S3: No), the program returns to the step S3 and the determination is repeated until the input from any key is detected. In the step S4, a determination is conducted as to whether the area designating key 6 has been input.

Figure 11:
FIG. 11 is a view of an example of a reversal image displayed in a liquid crystal display in the area setting process in the tape printing apparatus.

When the input from the area designating key 6 is detected (S4: Yes), the flow advances to a step S5 for the area designating process to designate the background pattern forming area. This step S5 is explained hereinafter with reference to FIG. 5. In a step S20, first, an area start point and an area end point of the background pattern forming area are determined by the current position of the cursor displayed on the display 4, then it is stored in the partial format 31B of the text memory 31. Then, a print image displaying process similar to the step S2 of the main process in FIG. 4 is conducted in a step S21. In the following step S22 a reversal process is applied to the background pattern forming area from the start point to the end point, and the thus reversed image is displayed on the display 4. For example, if the cursor is positioned on the character "C" of the characters "CANDY" input with the character keys 5 in the area designating process, those characters "CANDY" with the image "C" reversed as shown in FIG. 11 are displayed on the liquid crystal display 4.

In a step S23, it is determined if there is a key input from any key on the keyboard 3. When a key input is detected (S23: Yes), the program is advanced to the following step S24. When no key input is detected (S23: No), on the other hand, the flow returns to the step S23 and the determination is repeated until a key input from any key on the keyboard 3 is detected.

In a step S24, a decision is made whether any of the right and left keys 9 on the keyboard 3 has been input. When the input from the right and left keys 9 is detected (S24: Yes), in a step S25, the area start point and the area end point are changed in accordance with the cursor shifted with the key 9 and the data of the thus changed area start and end points are stored in the partial format 31B, setting the background pattern forming area, the flow advances to a step S26. When no input from the right and left keys 9 is detected (S24: No), the flow directly advances to a step S26. In the step 26, it is checked if the return key 10 on the keyboard 3 has been input. When it is determined that the return key 10 has been input (S26: Yes), the flow advances to a step S 6 of the main process in FIG. 4; however, when it is determined that the return key 10 has not been input (S26: No), the flow returns to the step S21 to repeat the operation of the step S21 and the following steps.

In the step S26, a decision is made that the return key 10 has been input (S26: Yes), as mentioned above, the process for changing the format within the area is conducted in the step S6 in FIG. 4. This process functions as designing means for setting various format (for instance, the types of background patterns, sizes, fonts, styles and so on) regarding the text within the background pattern forming area and storing the data thereof in the partial format 31B of the text memory 31, the detail of which will be described hereinafter referring to FIG. 6 and FIG. 6(A).

In a step S30, the data stored in the text memory 31 is copied into the memory area 37 and others of the RAM 30. In a step S31, a similar print image displaying process to the step S2 of the main process in FIG. 4 is conducted. In the following step S32, as well as in the step S22 in FIG. 5, the reversal process is applied to the background pattern forming area defined between the area start point and the area end point and the thus reversed images are displayed on the liquid crystal display 4. A determination is conducted in a step S33 as to whether any key on the keyboard 3 have been input or not. When the input from any key is detected (S33: Yes), the flow advances to a step S34; however, when no input from any key is detected (S33: No), it returns to the step S31 and the operation from S31 to S33 is repeated.

In the step S34, it is determined whether the ruled line key 11 on the keyboard 3 has been input. When a key input from the ruled line key 11 is detected (S34: Yes), then in a step S35, the type of background pattern and frame within the background pattern forming area are changed and the data thereof are stored in the partial format 31B of the text memory 31, and a step S36 follows. When no key input from the ruled line key 11 is detected (S35: No), the flow directly advances to the step S36 without conducting any operation.

In the step S36, a decision is made as to whether the size key 12 on the keyboard 3 has been input. When the key input from the size key 12 is detected (S36: Yes), the size of characters existing within the background pattern forming area is changed and the changed size data are stored in the partial format 31B of the text memory 31, and the flow advances to a step S38. To the contrary, when no key input from the size key 12 is detected (S36: No), the flow directly advances to a step S38 as no operation is made.

In the step S38, it is determined whether the font key 13 on the keyboard 3 has been input. When the key input from the font key 13 is detected (S38: Yes), the font of characters existing within the background pattern forming area is changed and the changed font data are stored in the partial format 31B of the text memory 31, and the flow advances to a step S40. When no key input from the font key 13 is detected (S38: No), on the other hand, the flow directly advances to the step S40.

In the step S40, a determination is conducted as to whether the style key 14 on the keyboard 3 has been input. When the input from the style key 14 is detected (S40: Yes), the flow advances to a step S40 where the style of characters existing within the background pattern forming area is changed and the thus changed style data are stored in the partial format 31B of the text memory 30 and then advances to a step S42. When the input from the style key 14 is not detected (S40: No), the flow directly advances to the step S42.

In the step 42, a determination is made as to whether the cancel key 15 on the keyboard 3 has been input. When it is detected that the cancel key 15 has been input (S42: Yes), the flow advances to a step S43 where the data copied into the memory area 37 and others of the RAM 30 in the step S30 is regenerated in the text memory 31 and then advances to a step S2 of the main process in FIG. 4. When it is determined that the cancel key 15 has not been input (S42: No), the flow directly advances to a step S44.

Next, in the step S44, it is detected whether the return key 10 on the keyboard 3 has been input. When the input from the return key 10 is detected (S44: Yes), the flow returns to the step S2 of the main process in FIG. 4; however, when no key input is detected (S44: No), it returns to the step S31 to repeat the operation of S31 and the following steps thereto.

Figure 4:
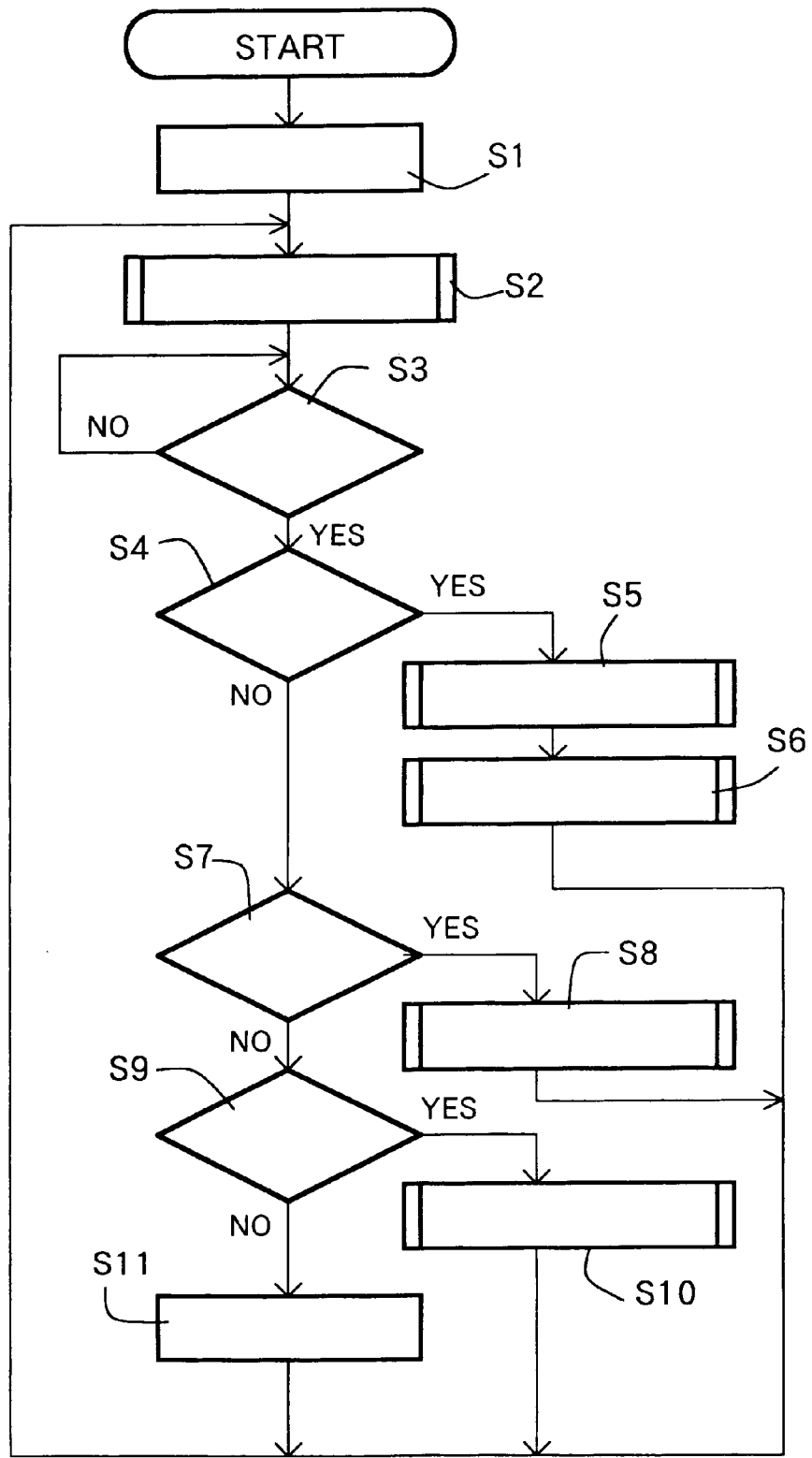

Here, returning to the step S4 of the main process in FIG. 4, the explanation of the main process is described. When no key input from the area designating key 6 is detected (S4: No), the flow advances to a step S7 where a determination is conducted as to whether the format setting key 7 on the keyboard 3 has been input. When it is determined that the format setting key 7 has been input (S7: Yes), the flow advances to a step S8 where various format of the entire text, for example, the type of whole frame, the horizontal or vertical arrangement of characters and so on, are selected and stored in the whole format 31A of the text memory 31. This step S8 is explained hereinafter with reference to FIG. 7.

Figure 12:
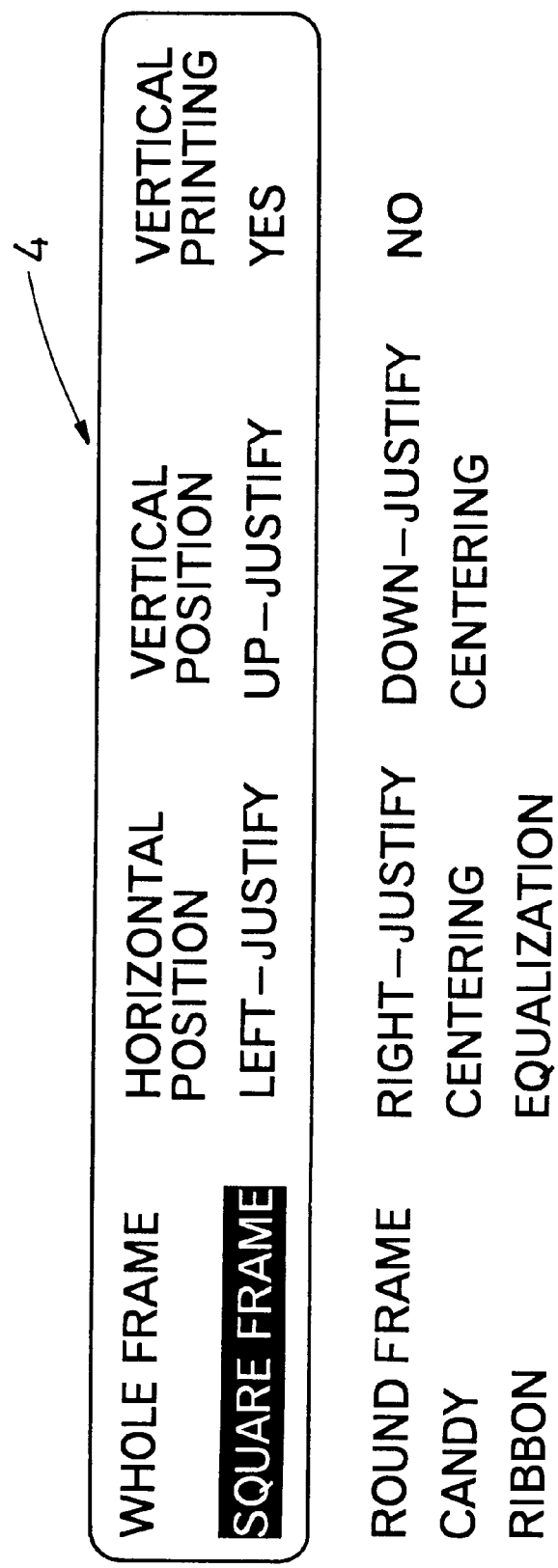
FIG. 12 is a view of an example of a format setting display shown on the liquid crystal display in the area setting process in the tape printing apparatus.

First, a format setting display shown in FIG. 12 is displayed on the liquid crystal display 4 in a step S50. In this format setting display in FIG. 12, indicated is a part of the current format data stored in the whole format 31A of the text memory 30. As mentioned above, an item "WHOLE FRAME" in FIG. 12 means a frame entirely surrounding a text, such as the frame 60 shown in FIG. 1 and the frame 100 shown in FIG. 23. Other items "HORIZONTAL POSITION", "VERTICAL POSITION" and "VERTICAL PRINTING" are related to the arrangement of characters such as letters.

In a step S51, it is detected if any key on the keyboard 3 has been input. When a key input is detected (S51: Yes), the flow advances to a step S52. When no key input is detected (S51: No), to the contrary, the flow returns to the step S51 to repeat such the determination until it is detected that any key on the keyboard 3 has been input.

Next, in a step S52, it is determined whether any of the right and left keys 9 on the keyboard 3 has been input. When the input from the right and left keys 9 is detected (S52: Yes), the cursor is shifted in accordance with the key input from the right and left keys 9 in a right and left direction on the liquid crystal display 4 and then the flow advances to a step S54. For example, on the format setting display in FIG. 12, an input of a right key 9 shifts the cursor rightward, i.e., from the position of "SQUARE FRAME" to that of "LEFT-JUSTIFY", then displaying "LEFT-JUSTIFY" in a reversed image. When no key input is detected (S52: No), the flow advances to a step S54 without carrying out any practice.

In a step S54, it is checked if any of the up and down keys 16 on the keyboard 3 has been input. When the input from any of the keys 16 is detected (S54: Yes), the format displayed in a reversed image on the liquid crystal display 4 is changed to a designated format and the changed format data are stored in the whole format 31A of the text memory 31. After that, the flow advances to a step S56.

With the format setting display shown in FIG. 12 on the display 4, for example, when a down key 16 is input, the cursor shifted downward indicates "ROUND FRAME" instead of "SQUARE FRAME", the frame data of "ROUND FRAME" are stored as a whole frame in the whole format 31A of the text memory 31. When the down key 16 is further input, the cursor is further shifted downward to indicate "CANDY" instead of "ROUND FRAME" and the frame data of "CANDY" are stored as a whole frame in the whole format 31A. When the down key 16 is furthermore input, the cursor indicates "RIBBON" and it is stored as a whole frame in the whole format 31A of the text memory 31. In this way, the input of the down key 16 allows the cursor to indicate the type of the frame; SQUARE FRAME, ROUND FRAME, CANDY, RIBBON in order and the whole format 31A of the text memory 30 to change in sequence and store the frame data.

Figure 23:
FIG. 23 is a view of an example of characters with a frame surrounding them in a printing apparatus in the prior art.

The frame 100 shown in FIG. 23 and other figures corresponds to "SQUARE FRAME" and the frame 60 shown in FIG. 1 corresponds to "CANDY", respectively. The items provided below each format in the format setting display in FIG. 12, for instance, "LEFT-JUSTIFY", "LOWER-JUSTIFY", "NO" in vertical printing, etc., can be selected and displayed in accordance with input of the up and down keys 16.

If it is determined that there is no input from the up and down keys 16 (S54: No), the flow advances a step S56 where a check is made if the return key 10 has been input. When it is checked that the return key 10 has been input (S56: Yes), the flow returns to the step S2 of the main process in FIG. 4. When it is checked that the return key 10 has not been input (S56: No), the flow returns to the step S51 to repeat the operation from the step S51 to the step S56.

Next, the explanation is continued returning to the step S7 of the main process in FIG. 4. When no input from the format setting key 7 is detected (S7: No), the flow advances to a step S9. In the step S9, a determination is conducted as to whether the print key 9 has been input. When the input of the key 9 is determined (S9: Yes), the flow advances to a step S10 where a printing process is carried out. This printing process in the step S10 functions as a data producing means for producing design data in the printing buffer 33 and a character data arrangement means for arranging character data into the design data in the printing buffer 33. In the printing process, the design data can be printed on a printing tape by means of the thermal printing mechanism PM.

Arrangement information producing process in a step S60 shown in FIG. 8, which is first conducted in the printing process of the step S10, will be explained hereinafter with reference to FIG. 9. The arrangement information producing process in the step S60 means the process for producing the character arrangement information 40 shown in FIG. 14 and the design pattern arrangement information 50 shown in FIG. 15, in the printing buffer 33.

The following description is made on the supposition that, in order to print a text as shown in FIG. 1, the characters "CANDY" has already been input in the step S11 of the main process in FIG. 4, which will be mentioned later, the background pattern forming area has already been set on the area of the characters "CANDY" in the step S25 in FIG. 5, the type of background pattern has been set to the background pattern 62 in the step S35 in FIG. 6, and the type of whole frame surrounding the characters "CANDY" has been set to "CANDY" which corresponds to the frame 60 with the ornament frames 61 shown in FIG. 1 in the step S55 in FIG. 7, and no underline is set. This set format is called "the set condition of FIG. 1" hereinafter.

At first, the character arrangement information 40 in FIG. 14 is produced based on the content stored in the text memory 31 in a step S80 and is stored in a character arrangement information memory area 35. In a step S81, the design pattern arrangement information 50 is produced based on the character arrangement information 40 and is stored in a design pattern information memory area 36. In the design pattern arrangement information 50 produced in the step S81 under the set condition of FIG. 1, two points positioned diagonally in the background pattern forming area of the background pattern 62, determined by the X1-position data 51, X2-position data 52, Y1-position data 53, and Y2-position data 54, are a left lower end point in the data area 101 of "C" of the characters "CANDY" (see FIG. 24) and a right upper end point in the data area 101 of "Y" of the same (see FIG. 24). As a result the background pattern forming area is set on a combination of all data area 101 of the characters "CANDY".

In a step S82, the text pointer TP is set at a start of the text memory 31. In a step S83, it is determined if the text pointer TP is the end value (EOT) of the text memory 31. If it is determined that the text pointer TP is not equal to the end value (EOT) (S83: Yes), when this text pointer TP indicates the partial format 31B of the text memory 31 (S84: Yes) and the information on a background pattern and a frame is stored in the partial format 31B (S85: Yes), then the partial format 31B is copied into the memory area 37 and others of the RAM 30 in a step S87.

In a step S88, by scanning the text pointer TP up to the end value (EOT) of the text memory 31, the content of the text memory 31 is read out and also the character arrangement information 40 produced in the step S80 is read out to calculate the X1-position data 51, X2-position data 52, Y1-position data 53, and Y2-position data 54 of the design pattern arrangement information 50, whereby to specify the position of the background pattern, the frame and others. Here, no underline is produced because there is no setting of underline in the set condition of FIG. 1.

In a step S89, the partial format 31B of the text memory 31 copied into the memory area 37 and others of the RAM 30 is read out and determined as to whether the information on a background pattern is stored in the partial format 31B. If it is determined that the information on a background pattern is stored in the partial format 31B (S90: Yes), the flow advances to a step S91 where a frame extending means operates. In the step S91, the area for the ornament frames is added to the background pattern forming area specified in the step S80. After that, the flow advances to a step S92.

Specifically, in the set condition of FIG. 1, as to the two points positioned diagonally in the background pattern forming area, the lateral width of one ornament frame 61 is deducted from the X1-position data 51 which is the left lower end point of the data area 101 of "C" of the characters "CANDY" (see FIG. 24) and the lateral width of another ornament frame 61 is added to the X2-position data 52 which is the right upper end point of the data area 101 of "Y" of the same characters. When no information on a background pattern is stored in the partial format 31B (S90: No), the flow advances to the step S92 where the design pattern arrangement information 50 is changed based on the information produced in the steps S88 and S91.

On the other hand, if it is determined that the text pointer is not equal to the end value (EOT) of the text memory 31 (S83: Yes), when which the text pointer TP indicates is not the partial format 31B (S84: No) or no information on a background pattern and so on is stored in the partial format 31B (S85: No), the flow advances to a step S86 where the text pointer TP proceeds by one letter (one information) of the text memory 31, after that the flow returns to the step S83.

If it is determined that the text pointer TP is equal to the end value (EOT) of the text memory 31 (S83: No), the flow advances to a step S93 where the information on the background pattern is sorted above (before) the information on a frame and an underline in the design pattern arrangement information 50 and to a step S61 of the printing process in FIG. 8. Namely, in the set condition of FIG. 1, a group of data in an upper step in the design pattern arrangement information 50 shown in FIG. 15 relates to the information on the background pattern 62, the lower group of data (in a lower step) relates to the information on the frame 60. As no underline is set in the condition, the information on an underline does not be produced.

The printing process will be described hereinafter referring to FIG. 8. First, the above mentioned process for producing the arrangement information is carried out in the step S60. After that, design pattern parameters FSP, FEP, FC are ensured in the memory area 37 and others of the RAM 30, to allow the design pattern parameter FSP to store the start address number 56 of the design pattern arrangement information 50, the design pattern parameter FEP to store the end address number 56 of the same, and the design pattern parameter FC to store a value "0". In a step S62, the group of data of the design pattern arrangement information 50 at the address number 56 indicated by the expression: FSP+ (FC×10) is read. The value "10" to be multiplied to the design pattern parameter FC corresponds to the moving amount of an address of one step in the design pattern arrangement information 50.

In a step 63, a decision is made if the group of data of the design pattern arrangement information 50 read in the step S62 is the information on a background pattern. When it is detected that the data group read in the step S62 is the information on a background pattern (S63: Yes), the flow advances to a step S64, where the background pattern data stored in the CGROM 21 are put on the printing buffer 33 based on the position of the background pattern forming area specified by the group of data of the design pattern arrangement information 50. After that, the flow advances to a step S65.

When it is detected that the group of data read in the step S62 is not the information on a background pattern (S63: No), the flow advances to a step S67 where it is determined as to whether the group of data of the design pattern arrangement information 50 read in the step S62 is the information on an ornament frame. When the group of data read out in the step S62 is the information on an ornament frame (S67: Yes), the logical multiply (AND) operation is conducted on the mask data stored in the CGROM 21 and the background pattern data of the printing buffer 33 based on the position of the ornament frame specified by the data group of the design pattern arrangement information 50 to delete a part of the background pattern data put on the printing buffer 33. In a step S69, the design data stored in the CGROM 21 are stored in the printing buffer 33 based on the position of the ornament frame specified by the data group of the design pattern arrangement information 50 and a whole frame is produced by connecting the design data by ruled lines (parallel lines). The flow then advances to a step S65.

When it is decided that the group of data of the design pattern arrangement information is not the information on an ornament frame (S67: No), the flow advances to a step S70 where the image data of ruled lines are drawn on the designated position in the printing buffer 33 based on the group of data of the design pattern arrangement information 50. After the completion of any of the above steps S64, S69, and S70, the flow advances to a step S65, then the value "1" is added to the design pattern parameter FC. In a step S66, it is determined whether the value of the expression: FSP+ (FC×10) is equal to the value of the design pattern parameter. If it is determined that the value of the expression: FSP+(FC×10) is not equal to the value of the design pattern parameter FEP (S66: No), the flow returns to the step S62 to repeat the operation from the step S62 and the following steps.

If it is determined that the value of the expression: FSP+(FC×10) is equal to the value of the design pattern parameter FEP (S66: Yes), the flow advances to a step S71 where character parameters CSP, CEP, and CC are ensured in the memory area 37 and others of the RAM 30, storing the start address number 46 of the character arrangement information 40 in the character parameter CEP, the end address number 46 of the character arrangement information 40 in the character parameter CEP, and the value "0" in the character parameter CC, respectively. In a step S72, read is a group of data of the character arrangement information 40 at the address number 46 indicated by the expression: CSP+(CC×10). The value "10" multiplied to the character parameter CC corresponds to the moving amount of an address of one step of the character arrangement information 40 in FIG. 14.

In a step S73, the dot pattern for printing stored in the CGROM 21 is stored in the printing buffer 33 based on the characters and the position both specified by the data group of the character arrangement information 40. After that, the flow advances to a step S74 where the value "1" is added to the character parameter CC. In a step S75, a determination is conducted as to whether the value of the expression: CSP+(CC×10) is the value of the character parameter CEP. When the value of the expression: CSP+(CC×10) is not the value of the character parameter CEP (S75: No), the flow returns to the step S71 to repeat the operation from the step S72 and the following steps. When the value of the expression: CSP+(CC×10) is the value of the character parameter CEP (S75: Yes), the flow advances to a step S76 where the content stored in the printing buffer 33 is printed on a printing tape by means of the thermal printing mechanism. The process returns to the step S2 for a print image process of the main process in FIG. 4.

Figure 16:
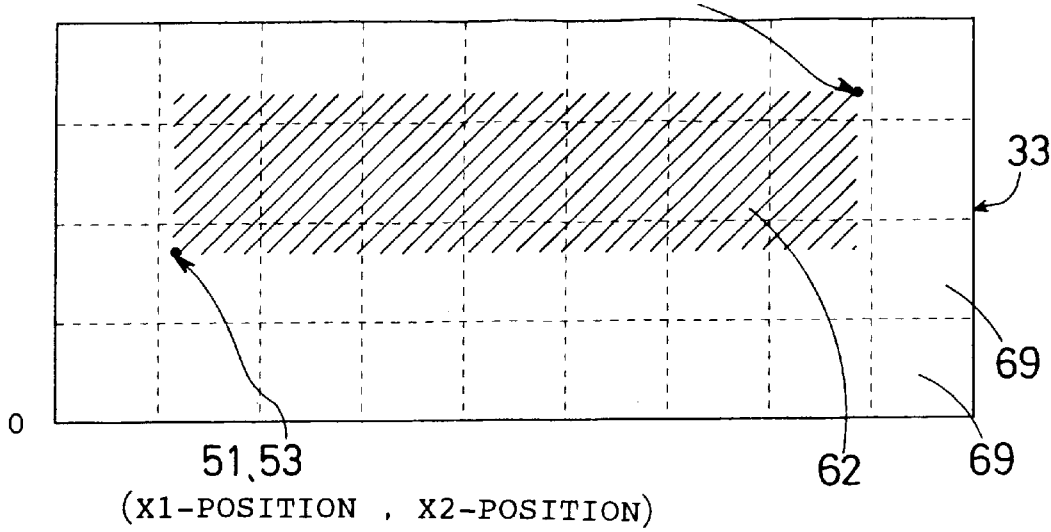
FIG. 16 is a view showing an image of a printing buffer when a background pattern data are put on the area where a background pattern is to be formed in the tape printing apparatus.
Figure 17:
FIG. 17 is a view showing an image of a background pattern data stored in CGROM.

Next, the operation for the printing process under the set condition of FIG. 1 will be explained with reference to FIG. 16 through FIG. 20. FIGS. 16, 18, 19, and 20 are views of images in the printing buffer 33 during the printing process. FIG. 17 is a view of an image of the background pattern data stored in the CGROM 21.

First, in a step S60, the arrangement information producing process is conducted with respect to the set condition of FIG. 1 to produce the character arrangement information 40 shown in FIG. 14 and the design pattern arrangement information 50 shown in FIG. 15. Next, in a step S61, the value "0" of the start address number 56 of the design pattern arrangement information 50 is stored in the design pattern parameter FSP, the value "20" of the end address number 56 of the design pattern arrangement information 50 is stored in the design pattern parameter FEP, and the value "0" is stored in the design pattern parameter FC.

In a step S62, the group of data of the design pattern arrangement information 50 at the address number 56 indicated by "0" of the expression: FSP+(FC×10) is read. Thus read group of data of the design pattern arrangement information 50 is the group of data in the upper step of the design pattern arrangement information 50 shown in FIG. 15. In the printing tape apparatus 1 according to the present invention, the information on the background pattern 62 is arranged in the upper step of the design pattern arrangement information 50 by the arrangement information producing process in the step S93 (S63: Yes), the flow advances to a step S64. In the step S64, the background pattern data stored in the CGROM 21 is put on the printing buffer 33 based on the position of the background pattern forming area of the background pattern 62 specified by the group of data in the upper step of the design pattern arrangement information 50 as shown in FIG. 16. The size of the background pattern data 70 stored in the CGROM 21, as shown in FIGS. 16 and 17, is equal to that of the unit area 69 defined by dividing the printing buffer 33 into plural areas each having the same size. The putting operation of the background pattern data 70 is made by unit areas 69 individually.

At this moment, the left lower end point (indicated by the X1-position 51 and the Y1-position 53) of the background pattern 62 data put on the printing buffer 33 shown in FIG. 16 is the point which is shifted leftward from the left lower end point of the data area 101 of "C" of the characters "CANDY" (see FIG. 24) by the amount of the lateral width of the ornament frame 61. The right upper end point of the background pattern 62 is the point which is shifted rightward from the right upper end point of the data area 101 of "Y" by the lateral width of the ornament frame 61. Accordingly, the whole frame 60 with the ornament frames 61 can be arranged on the boundary of the background pattern 62 put on the printing buffer 33 shown in FIG. 16.

Thereafter, in a step S65, when the value "1" is added to the design pattern parameter FC, the expression: FSP+(FC× 10) is equal to "10"; however, it is different from the value "20" of the design pattern parameter FEP, thus the flow returns to the step S62.

In the step S62, read is a group of data of the design pattern arrangement information 50 at the address number 56 indicated by the "10" of the expression: FSP+(FC×10). Thus read data group of the design pattern arrangement information 50 is the group of data in the lower step of the design pattern arrangement information 50 shown in FIG. 15. In the printing tape apparatus 1 according to the present invention, the information on the frame 60 combined with the ornament frames 61 is arranged in the lower step of the design pattern arrangement information 50 in the step S93 for the arrangement information producing process in FIG. 9 (S63: No) (S67: Yes), and the flow advances to a step S68.

Figure 3:
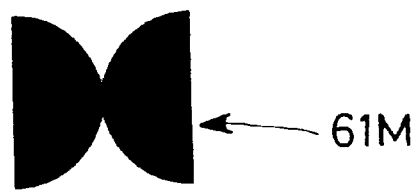
FIG. 3 is a view of an example of mask data.
Figure 18:
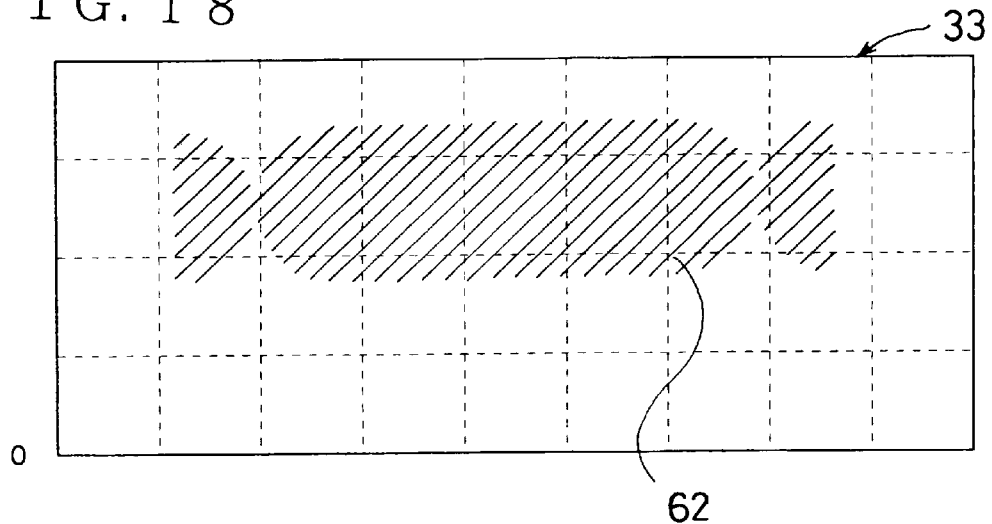
FIG. 18 is a view showing an image of the printing buffer when a part of the background pattern data in the background pattern forming area is deleted with mask data in the printing process in the tape printing apparatus.

In the step S68, a logical multiply (AND) operation is applied on the mask data 61M shown in FIG. 3, stored in the CGROM 21, with the background pattern data of the background pattern 62 in the printing buffer 33 based on the position of the ornament frame 61 specified by the group of data in the lower step of the design pattern arrangement information 50, thereby to delete a part of the background pattern 62 put on the printing buffer 33, as shown in FIG. 18. As a result thereof, the boundary of the background pattern 62 coincides with the outline of the whole frame 60 with the ornament frames 61 shown in FIG. 1.

Figure 2:
FIG. 2 is a view of an example of ornament frames.
Figure 19:
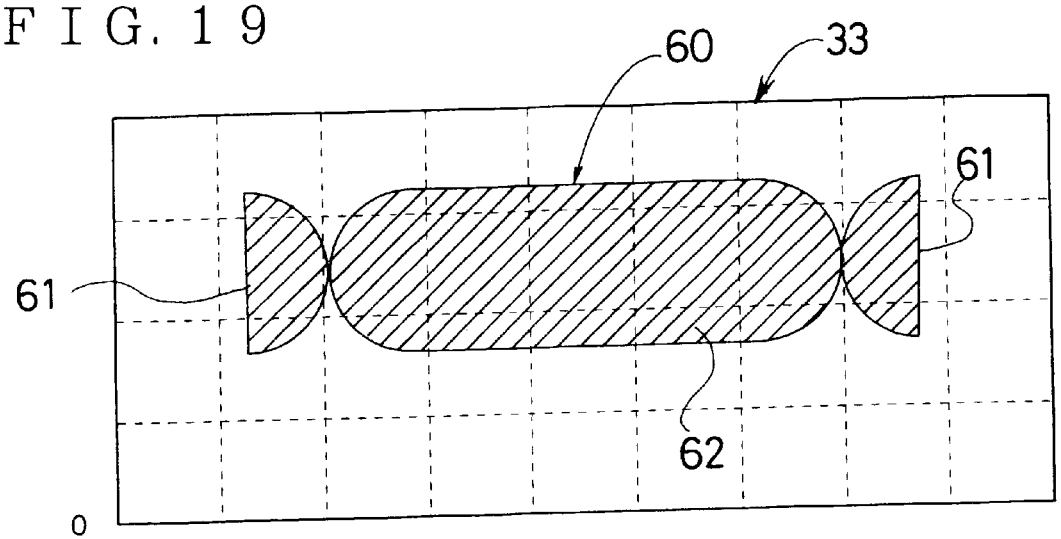
FIG. 19 is a view showing an image of the printing buffer when a whole frame is formed by design data and lines on the background pattern data of FIG. 18.

In a step S69, the ornament frame data 61D shown in FIG. 2 stored in the CGROM 21 are stored in the printing buffer 33 based on the positions of the ornament frames 61 specified by the group of data in the lower step of the design pattern arrangement information 50, and the whole frame 60 with the ornament frames 61 shown in FIG. 1 is produced by connecting the end points of the ornament frames 61 with ruled lines (parallel lines), as shown in FIG. 19. The flow then advances to a step S65. In this way, the design data in which the background pattern 62 are added in the entire area within the whole frame 60 can be produced in the printing buffer 33.

After that, in the step S65, when the value "1" is added to the design pattern parameter FC, the expression: FSP+(FC× 10) is equal to "20". As this value become equal to the value "20" of the design pattern parameter FEP (S66: Yes), the flow advances to a step S71. As no underline is set in the set condition of FIG. 1, the flow does not advance to a step S71 where the image data of underline are drawn on the printing buffer 33.

In a step S71, the value of the start address number 46 of the character arrangement information 40 is stored in the character parameter CSP, the value "50" of the end address number 46 of the character arrangement information 46 is stored in the character parameter CEP, and the value "0" is stored in the character parameter CC, respectively. In a step S72, read is a group of data of the character arrangement information 40 at the address number 46 indicated by "0" of the expression: FSP+(FC×10). In a step S73, based on the characters and the position specified by the group of data of the character arrangement information 40, the dot pattern data for printing, stored in the CGROM 21 are stored in the printing buffer 33. At this moment, the information on the character "C" is included in the group of data of the character arrangement information 40 at the address number 46 which is "0" as shown in FIG. 14, therefore the printing dot pattern for the character "C" is stored in the printing buffer 33.

Figure 20:
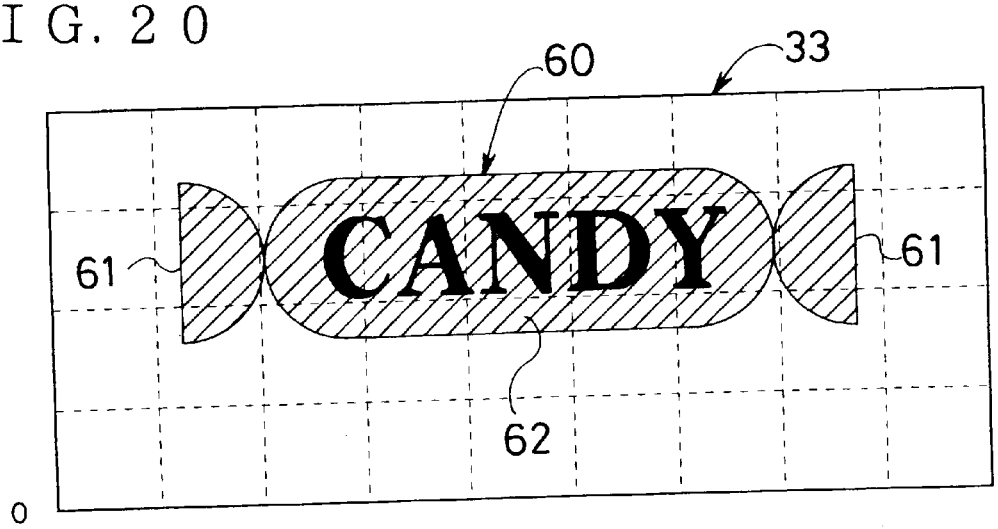
FIG. 20 is a view showing an image of the printing buffer to be printed on a printing tape by a thermal printing mechanism at the printing process in the tape printing apparatus.

In a step S74, when the value "1" is added to the character parameter CC, the expression: FSP+(FC×10) becomes "10". This is different from the value "50" of the character parameter CEP (S75: No), the flow returns to the step S72. The same operation as above is repeatedly conducted on the character "A" corresponding to the group of data of the character arrangement information 40 at the address number 46 being "10". Furthermore, the same operations are performed until the value of the character parameter CEP reaches "50", namely, on the character "N" corresponding to the address number 46 being "20", the character "D" corresponding to the address number 46 being "30", and the character "Y" corresponding to the address number 46 being "40". Consequently, as shown in FIG. 20, the characters "CANDY" can be arranged on the whole frame 60 in the entire area of which the background pattern 62 is provided.

In a step S75, thereafter, it is determined that the value of the expression: FSP+(FC×10) is equal to the value "50" of the character parameter CEP (S75: Yes), the flow advances to a step S76, where the content stored in the printing buffer 33, shown in FIG. 20, is printed on a printing tape by means of the thermal printing mechanism.

Figure 8:
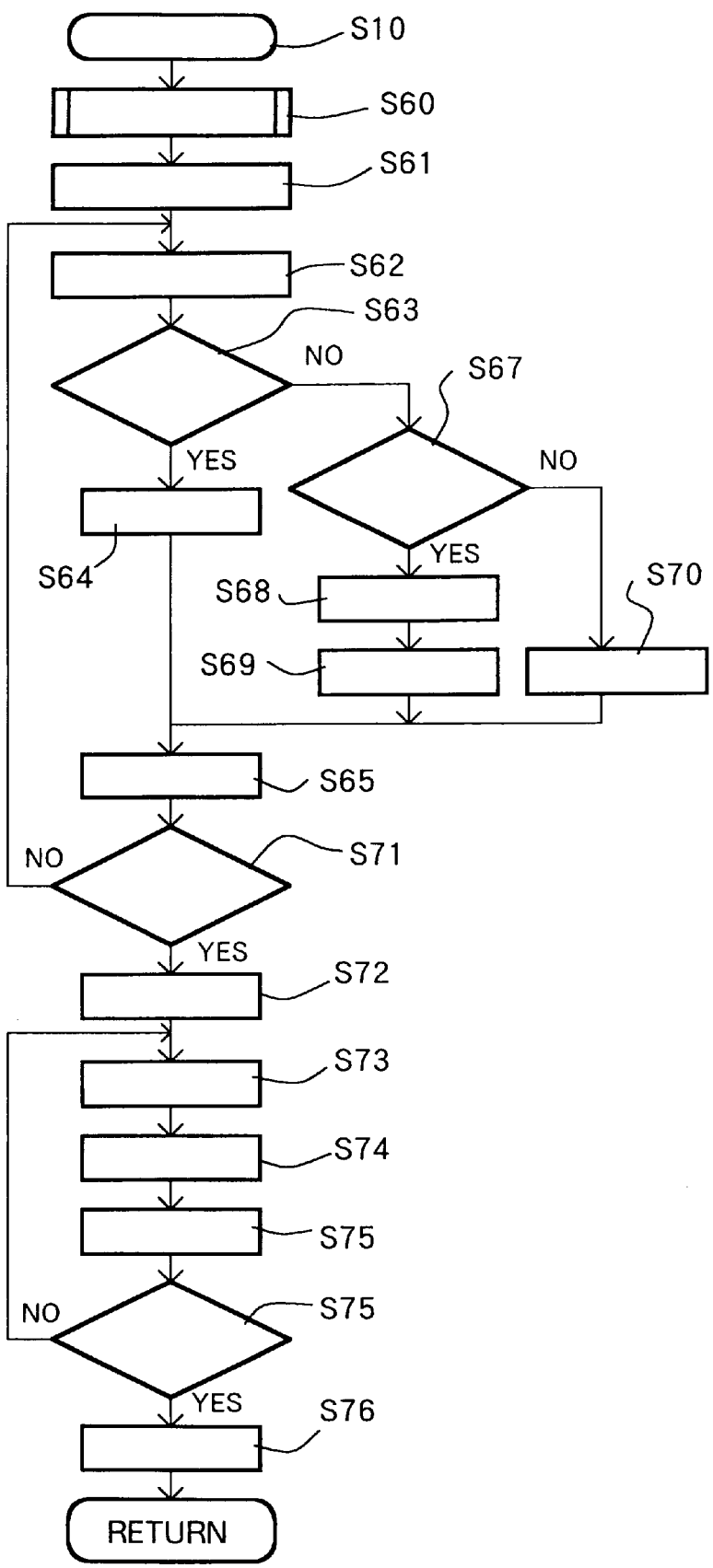

Here, the print image displaying process in the step S2 of the main process of FIG. 4 is, excepting a part thereof, the same as the printing process of FIG. 8. This print image displaying process in the step S2 is a process for displaying the image to be printed on a printing tape on the liquid crystal display 4, and will be explained with reference to FIG. 10.

First, in a step S99, conducted is the arrangement information producing process which is the same as in the step S60 shown in FIG. 8. In a step S100, the character arrangement information 40 and the design pattern arrangement information 50 produced in the arrangement information producing process are converted into the data for display on the liquid crystal display 4. The following operations are the same as in the printing process in FIG. 8 if excepting a step S116 and exchanging the printing buffer 33 for a displaying buffer 34.

That is, the design pattern parameters FSP, FEP, and FC are ensured in the memory area 37 and the others of the RAM 30 in step S101, where the start address number 56 of the design pattern arrangement information 50 is stored in the design pattern parameter FSP, the end address number 56 of the same is stored in the design pattern parameter FEP, and the value "0" is stored in the design pattern parameter FC, respectively. In a step S102, read is a group of data of the design pattern arrangement information 50 at the address number 56 indicated by the expression: FSP+(FC×1 0). This value "10" which is multiplied to the design pattern parameter FC corresponds to the moving amount of an address in one step of the arrangement information 50 in FIG. 15.

In a step S103, it is determined whether the group of data of the design pattern arrangement information 50, which is read out in the step S102, is the information on a background pattern. When it is determined that the group of data read in the step S102 is the information on a background pattern (S103: Yes), the flow advances to a step S104 where the background pattern data stored in the CGROM 21 is put on the displaying buffer 34 based on the position of the background pattern forming area specified by the group of data of the design pattern arrangement information 50. After that, the flow advances to a step S105.

When it is determined that the group of data read in the step S102 is not the information on a background pattern (S103: No), the flow advances to a step S107, where it is decided whether the group of data read in the step S102 is the information on an ornament frame. When it is decided that the group of data read in the step S102 is the information on an ornament frame (S107: Yes), a logical multiply (AND) operation is conducted on the mask data stored in the CGROM 21 with the background pattern data in the displaying buffer 34 based on the position of the ornament frames specified by the group of data of the design pattern arrangement information 50 in a step S108, to delete a part of the background pattern data put on the displaying buffer 34. In a step S109, thereafter, the ornament frame data stored in the CGROM 21 are stored in the displaying buffer 34 based on the position of the ornament frames specified by the group of data of the design pattern arrangement information 50, and further the whole frame is produced by connecting the ornament frames with ruled lines. The flow then advances to a step S105.

When it is decided that the group of data read in the step S102 is not the information on an ornament frame (S107: No), the flow advances to a step S110 where the image data of underline are drawn on the designated position in the displaying buffer 34 based on the group of data of the design pattern arrangement information 50.

After the completion of any of the above steps S104, S109, and S 110, the flow advances to a step S105 where the value "1" is added to the design pattern parameter FC. In a step S106, a determination is conducted as to whether the value of the expression: FSP+(FC×10) is the value of the design pattern parameter FEP. When it is determined that the value of the expression is not the value of the design pattern parameter (S106: No), the flow returns to the step S102, repeating the operations from the step S102 and the followings.

When it is determined that the value of the expression: FSP+(FC×10) is the value of the design pattern parameter FEP (S106: Yes), the start address number 46 of the character arrangement information 40 is stored in the character parameter CSP, the end address number 46 of the character arrangement information 40 is stored in the character parameter CEP, and the value "0" is stored in the character parameter CC, respectively, in a step S111. In a step S112, continually, a group of data of the character arrangement information 40 at the address number 46 indicated by the expression (CSP+(CC×10) is read. The value "10" in the expression corresponds to the moving amount of an address of on step in the character arrangement information 40.

In a step S 113, the dot pattern data for printing, stored in the CGROM 21, are stored in the printing buffer 33 based on the characters and positions specified by the group of data of the character arrangement information 40. The flow advances to a step S114 thereafter, where the value "1" is added to the character parameter CC. In a step S115, it is determined whether the value of the expression: CSP+(CC× 10) is the value of the character parameter CEP. When it is determined that the value of the expression is not the value of the character parameter CEP (S115: No), the flow returns to the step S112 to repeat the operation from the step S112. When it is determined that the value of the expression is the value of the character parameter CEP (S115: Yes), the flow advances to a step S116, where the content stored in the displaying buffer 34 is displayed on the liquid crystal display 4, and then to the step S3 of the main process in FIG. 4.

Returning to the step S9 of the main process in FIG. 4, when it is determined that the print key 9 has not been input (S9: No), the flow advances to a step S11 to perform the operation in accordance with the input key. For example, the operation of the character keys 5 causes the input of various character data.

As described above, in the tape printing apparatus 1 in the present embodiment, when setting the formation of the frame 60 around the characters "CANDY" input by the character keys 5 on the keyboard 3 (S11) and the background pattern 62 on the back of the characters "CANDY" (S55, S25), the printing process in the step S10 generates the background pattern data including the background pattern forming area in the printing buffer 33 (S64) based on the design pattern arrangement information 50 that is produced for the characters "CANDY" and the frame 60 (S60). And a logical multiply (AND) operation is performed on the mask data 61M of the ornament frame 60 corresponding to both end portions of the frame 60 read from the CGROM 21 with the background pattern data of the printing buffer 33 where the ornament frames 61 are arranged, thereby to delete the part outside the ornament frames 61 from the background pattern data having the background pattern forming area in the printing buffer 33 (S68). The frame data produced based on the design pattern arrangement information 50 are then arranged on the background pattern data in the printing buffer 33 (S69), and the dot pattern printing data for the characters "CANDY" are arranged within the frame data in the printing buffer 33 (S73). In this way, the content of the printing buffer 33 is printed on a printing tape by means of the thermal printing mechanism (S76). When the setting of the background pattern 62 is input within the frame 60, the background pattern 62 can be formed in the entire area inside the frame 60, improving the appearance of the text printed on the printing tape.

In the arrangement information producing process in the step S60, when the ornament frames 61 are added to both end portions of the frame 60 to be formed around the characters "CANDY", the design pattern arrangement information 50 is produced extending by the length of the ornament frame 61 (S91). The background pattern data produced in the printing buffer 33 based on the design pattern arrangement information 50 can include the data of the frame 60 surrounding the characters "CANDY". When the setting of the background pattern 62 is input within the frame 60, the background pattern 62 can be printed in the entire area within the frame 60. It is accordingly possible to improve the appearance of the printed text.

Furthermore, the ornament frame data 61D corresponding to both end portions of the frame 60 are stored in the CGROM 21, and in the printing process in the step S10 the frame data are produced every setting by connecting the ornament frame data 61D with ruled lines (S69). Accordingly, it is unnecessary to store in advance the frame data having various sizes, so that the capacity of a memory of the CGROM 21 can be saved.

The present invention may be embodied in other specific forms without departing from the spirit or essential characteristics thereof.

Figure 5:
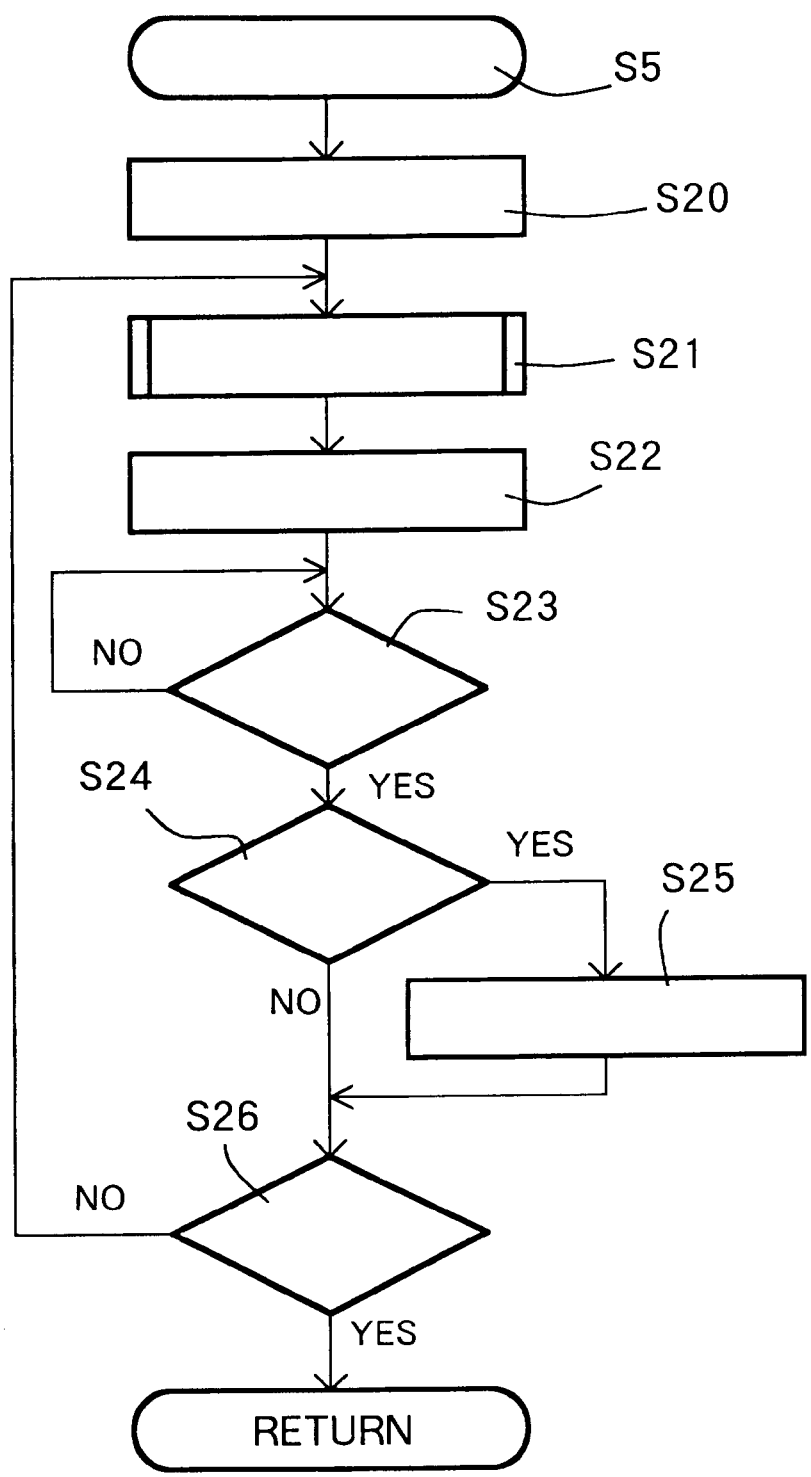
Figure 6:
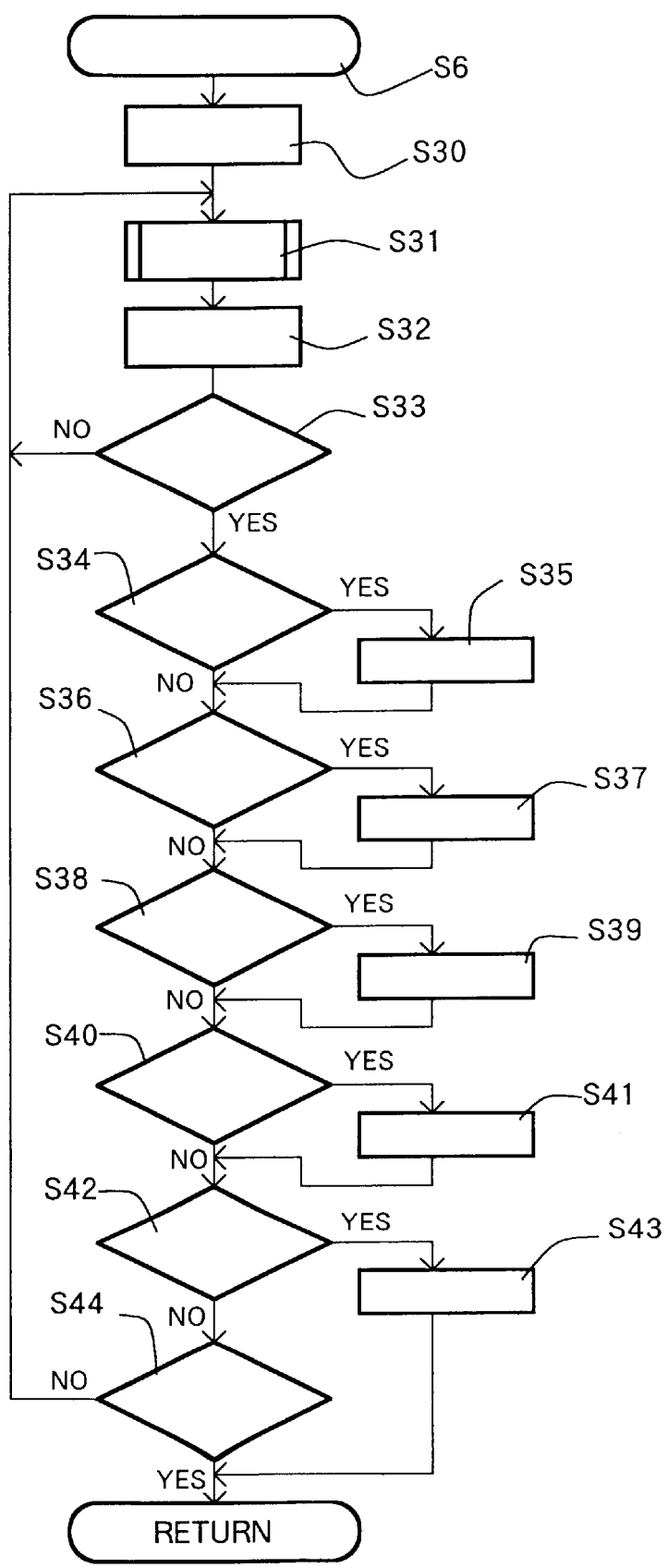
Figure 7:
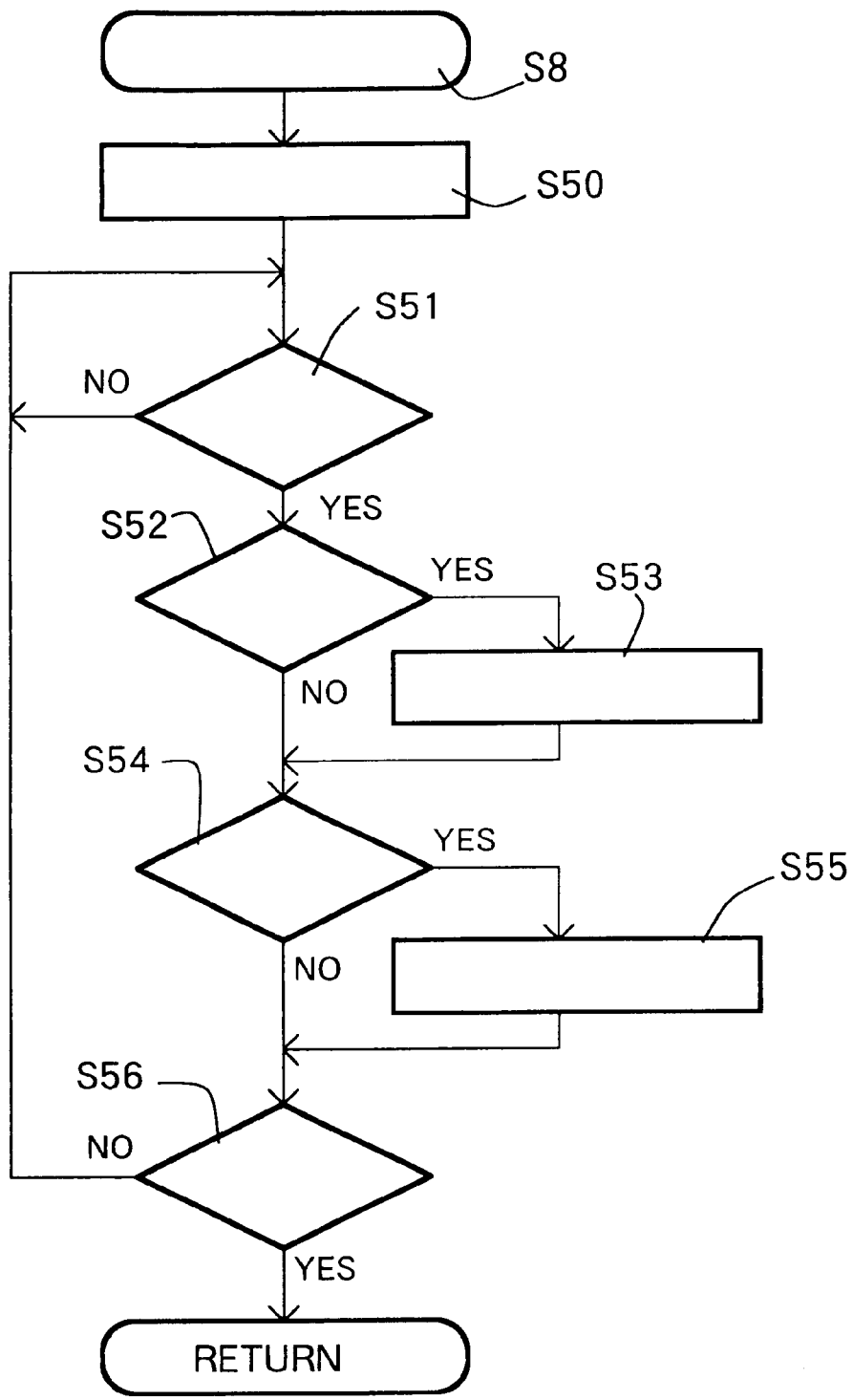

For instance, in the above embodiment, the background pattern forming area is set every character unit by the cursor displayed on the liquid crystal display 4 (S25) in the area setting process in FIG. 5, it may be set by a whole frame unit on the format setting display in the format setting process in FIG. 7.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated.

It is intended that the scope of the invention be defined by the claims appended hereto, and their equivalents.

What is claimed is:

1. A printing apparatus comprising:
    input means for inputting various characters;
    design setting means for selecting a design pattern including a frame to be added around said characters and a background pattern to be added on a background of said characters thereby to emphasize the characters;
    memory means for storing ornament frame data of an ornament frame to be arranged at both sides of said frame, and mask data of the ornament frame;
    frame extending means for extending both sides of the frame selected by the design setting means corresponding to a length of the ornament frame when the background pattern is selected by the design setting means;
    first data producing means for producing first frame data of the frame extended by the frame extending means, the first frame data having a predetermined area, and first background pattern data of the background pattern selected by said design setting means, the first background pattern data having a predetermined area;
    second data producing means for producing design data by generating second background pattern data by a logical multiply of said first background pattern data and said mask data of the ornament frame and arranging the second background pattern data within second frame data specified by said ornament frame data and the first frame data;
    character data arrangement means for arranging character data input by means of said input means in the design data; and
    printing means for printing said design data and character data.

2. A printing apparatus according to claim 1, further comprising:
    a text memory for storing text data including said character data;
    a printing buffer for storing therein respective data of the design data produced by said first and second data producing means;
    character arrangement data producing means for producing arrangement data of said characters in the printing buffer based on the text data in the text memory; and
    design pattern arrangement data producing means for producing coordinate data on the printing buffer for arrangement data of the design pattern in the printing buffer based on the character arrangement data.

3. A printing apparatus according to claim 2, wherein arrangement data of the background pattern is produced so that both sides of the background pattern are extended respectively by a length of the ornament frame when the design pattern is a background pattern.

4. A printing apparatus according to claim 3, wherein said first data producing means determines an area of the first background pattern data based on the arrangement data of the extended background pattern.

5. A printing apparatus according to claim 4, wherein said second data producing means arranges the first background pattern data in the printing buffer in accordance with the area of the first background pattern data determined by the first data producing means.

6. A printing apparatus according to claim 5, wherein said second data producing means produces the second background pattern data in the printing buffer by calculating a logical multiply of the mask data of the ornament frame and the first background pattern data when an ornament frame is set and deleting a background pattern data existing in an area not overlapping with the mask data within the mask data area.

7. A printing apparatus according to claim 6, wherein said second data producing means produces the second frame data by arranging the ornament frame data at both sides on the second background pattern data and connecting ornament frames with each other with parallel lines.

8. A printing apparatus according to claim 7, wherein said character data arrangement means arranges the character data into the second background pattern data within the second frame data in accordance with the character arrangement data produced by means of said character arrangement data producing means.

9. A printing apparatus according to claim 4, wherein the area of said first background pattern data is specified by two points determined by X–Y coordinates on the printing buffer, the two points having a positionally diagonal relation to each other.

10. A printing apparatus according to claim 9, wherein said two points correspond to a left lower end point and a right upper end point respectively in the area of the first background pattern data.

11. A printing apparatus according to claim 7, wherein the area of said second frame data is specified by two points determined by X–Y coordinates in each of ornament frames arranged in both sides of the first frame data on the printing buffer, the two points having a positionally diagonal relation to each other.

12. A printing apparatus according to claim 11, wherein said two points correspond to a left lower end point in an ornament frame and a right upper end point in another ornament frame.

13. A printing apparatus comprising:
    input means for inputting various characters;
    design setting means for selecting a design pattern including a frame to be added around said characters and a background pattern to be added on a background of said characters thereby to emphasize the characters;
    first memory means for storing ornament frame data of an ornament frame to be arranged at both sides of said frame, and mask data of the ornament frame;
    frame extending means for extending both sides of the frame selected by the design setting means corresponding to a length of the ornament frame when the background pattern is selected by the design setting means;
    second memory means for storing position data which specifies an area in which said frame and background pattern are to be formed;
    data changing means for changing the position data of the background pattern stored in the second memory means so that a background pattern is extended by a length of the ornament frame at both sides of the background pattern when said design pattern is a background pattern;

first data producing means for producing first frame data of the frame extended by the frame extending means, and first background pattern data of the background pattern selected by said design setting means based on the forming area specified by the position data changed by the data changing means;

second data producing means for producing design data by generating second background pattern data by a logical multiply of said first background pattern data and said mask data of the ornament frame and arranging the second background pattern data within second frame data specified by said ornament frame data and the first frame data;

character data arrangement means for arranging character data input by means of said input means into the design data; and printing means for printing said design data and character data.

* * * * *